United States Patent
Kim et al.

(10) Patent No.: US 10,383,135 B2
(45) Date of Patent: Aug. 13, 2019

(54) APPARATUS AND METHOD FOR RELAYING DATA IN WIRELESS ACCESS SYSTEM SUPPORTING DEVICE TO DEVICE COMMUNICATION

(71) Applicant: LG ELECTRONICS INC., Seoul (KR)

(72) Inventors: Seonwook Kim, Seoul (KR); Hanbyul Seo, Seoul (KR); Inkwon Seo, Seoul (KR); Seungmin Lee, Seoul (KR); Youngtae Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 79 days.

(21) Appl. No.: 15/327,359

(22) PCT Filed: Jul. 23, 2015

(86) PCT No.: PCT/KR2015/007682
§ 371 (c)(1),
(2) Date: Jan. 18, 2017

(87) PCT Pub. No.: WO2016/013888
PCT Pub. Date: Jan. 28, 2016

(65) Prior Publication Data
US 2017/0171874 A1   Jun. 15, 2017

Related U.S. Application Data

(60) Provisional application No. 62/105,758, filed on Jan. 21, 2015, provisional application No. 62/028,289, filed on Jul. 23, 2014.

(51) Int. Cl.
*H04W 72/12* (2009.01)
*H04W 28/02* (2009.01)
(Continued)

(52) U.S. Cl.
CPC .......... *H04W 72/12* (2013.01); *H04B 7/2606* (2013.01); *H04L 5/0048* (2013.01);
(Continued)

(58) Field of Classification Search
CPC .......... H04L 5/00; H04L 12/741; H04W 4/08; H04W 36/00; H04W 40/22; H04W 56/00;
(Continued)

(56) References Cited

U.S. PATENT DOCUMENTS

2005/0113066 A1* 5/2005 Hamberg .......... H04L 29/06027
455/411
2013/0229931 A1* 9/2013 Kim ...................... H04W 24/10
370/252

(Continued)

FOREIGN PATENT DOCUMENTS

| EP | 3163937 | 5/2017 |
|---|---|---|
| WO | 2015143170 | 9/2015 |

OTHER PUBLICATIONS

European Patent Office Application Serial No. 15824659.5, Search Report dated Jan. 30, 2018, 9 pages.

(Continued)

*Primary Examiner* — Andrew Lai
*Assistant Examiner* — Andrew C Lee
(74) *Attorney, Agent, or Firm* — Lee Hong Degerman Kang Waimey

(57) ABSTRACT

The present invention relates to methods for efficiently relaying device to device (D2D) data utilizing a relay terminal (rUE) in a wireless access system supporting D2D communication, and apparatuses for supporting the methods. As one example of the present invention, a method for relaying D2D data by a relay terminal in a wireless access system supporting D2D communication may comprise the steps of: receiving a scheduling allocation (SA) signal for
(Continued)

allocating a resource area where the D2D data are transmitted; receiving at least one D2D data; and relaying, from among the at least one D2D data, only the first D2D data received from a terminal out of coverage. The first D2D data among the at least one D2D data can be detected on the basis of a SA signal and a medium access control header relating to the at least one D2D data.

12 Claims, 15 Drawing Sheets

(51) Int. Cl.
| | |
|---|---|
| H04W 28/06 | (2009.01) |
| H04W 88/04 | (2009.01) |
| H04W 76/14 | (2018.01) |
| H04L 5/00 | (2006.01) |
| H04L 12/741 | (2013.01) |
| H04W 40/22 | (2009.01) |
| H04W 56/00 | (2009.01) |
| H04B 7/26 | (2006.01) |

(52) U.S. Cl.
CPC ............. *H04L 45/74* (2013.01); *H04W 28/02* (2013.01); *H04W 28/06* (2013.01); *H04W 40/22* (2013.01); *H04W 56/002* (2013.01); *H04W 76/14* (2018.02); *H04W 88/04* (2013.01)

(58) Field of Classification Search
CPC ..... H04W 72/12; H04W 72/14; H04W 76/02; H04W 76/14
USPC ........................................ 370/329; 455/426.1
See application file for complete search history.

(56) References Cited

U.S. PATENT DOCUMENTS

| | | | |
|---|---|---|---|
| 2014/0133332 A1 | 5/2014 | Lee | |
| 2014/0321314 A1* | 10/2014 | Fodor | ................. H04W 72/085 370/252 |
| 2015/0271846 A1* | 9/2015 | Kowalski | .............. H04W 72/14 370/329 |
| 2015/0271860 A1* | 9/2015 | Baghel | .................. H04W 76/14 455/426.1 |

OTHER PUBLICATIONS

Itri, "On MAC Header ID in D2D Communication", 3GPP TSG RAN WG2 Meeting #85bis, R2-141347, XP050792550, Apr. 2014, 4 pages.
Asadi, A. et al., "WiFi Direct and LTE D2D in Action", 2013 IFIP Wireless Days (WD), DOI: 10.1109/WD.2013.6686520, XP055186549, Nov. 2013, 8 pages.
Ericsson, "Overview of D2D Scheduling", 3GPP TSG RAN WG2 Meeting #85, R2-140626, XP050791938, Feb. 2014, 5 pages.
PCT International Application No. PCT/KR2015/007682, Written Opinion of the International Searching Authority dated Nov. 27, 2015, 20 pages.
Ericsson, "On Scheduling Assignments and Receiver Behaviour", R1-141391, 3GPP TSG RAN WG1 Meeting #76bis, Apr. 2014, 7 pages.
Interdigital, "On control signaling and scheduling assignments for D2D", R1-142350, 3GPP TSG RAN WG1 Meeting #77, May 2014, 4 pages.
Sharp, "CRC scrambling for Scheduling assignment", R1-142204, 3GPP TSG RAN WG1 Meeting #77, May 2014, 3 pages.
Asadi et al., "WiFi Direct and LTE D2D in Action," Institute IMDEA Networks, IEEE 10.1109/WD.2013.6686520, Nov. 2013, 8 pages.
European Patent Office Application Serial No. 15824659.5, Office Action dated Jan. 4, 2019, 7 pages.

* cited by examiner

FIG. 9
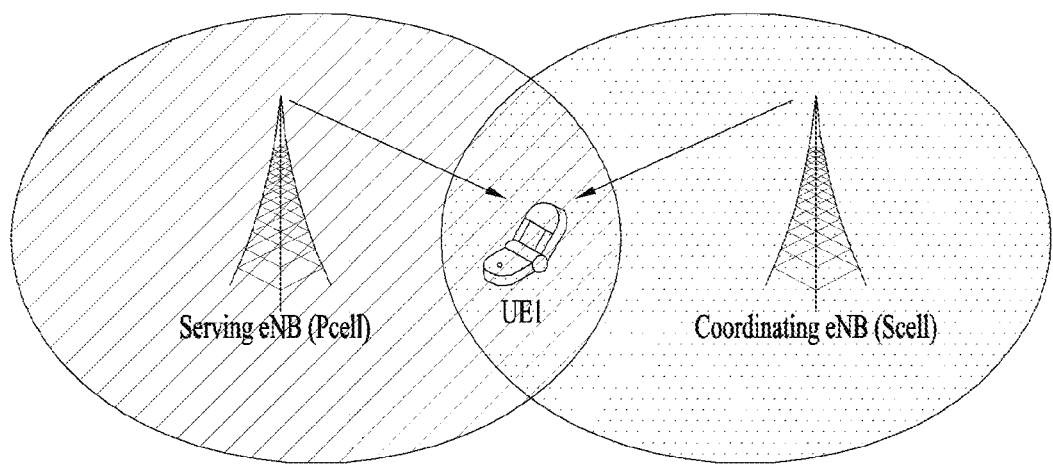
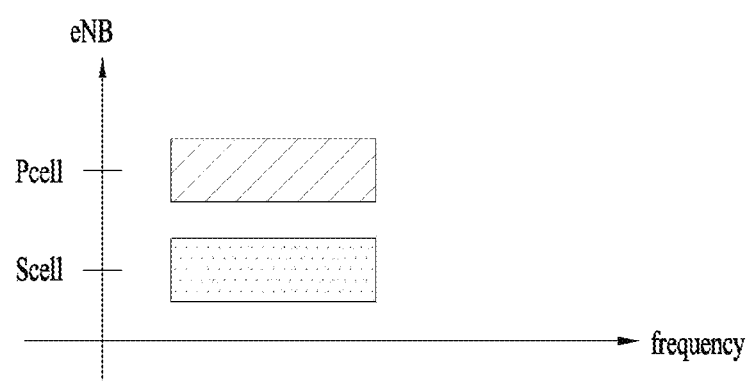

D2D signal transmission from a UE allocated with unit #0

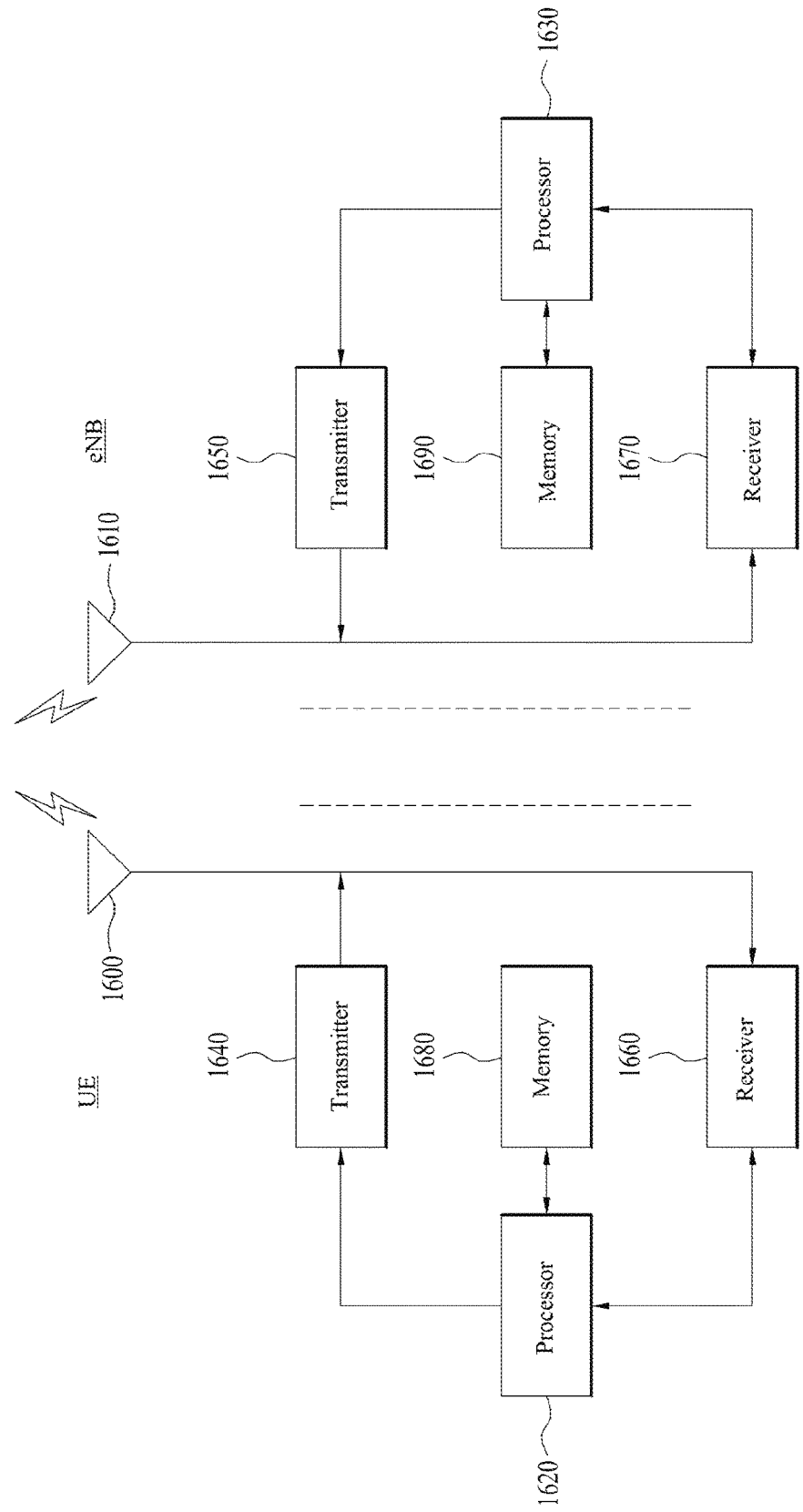

APPARATUS AND METHOD FOR RELAYING DATA IN WIRELESS ACCESS SYSTEM SUPPORTING DEVICE TO DEVICE COMMUNICATION

CROSS-REFERENCE TO RELATED APPLICATIONS

This application is the National Stage filing under 35 U.S.C. 371 of International Application No. PCT/KR2015/007682, filed on Jul. 23, 2015, which claims the benefit of U.S. Provisional Application Nos. 62/028,289, filed on Jul. 23, 2014 and 62/105,758, filed on Jan. 21, 2015, the contents of which are all hereby incorporated by reference herein in their entirety.

TECHNICAL FIELD

The present invention relates to methods of efficiently relaying D2D data by utilizing a relay UE (rUE) in a wireless access system supporting D2D (device to device) communication and a device supporting the methods.

BACKGROUND ART

Wireless access systems have been widely deployed to provide various types of communication services such as voice or data. In general, a wireless access system is a multiple access system that supports communication of multiple users by sharing available system resources (a bandwidth, transmission power, etc.) among them. For example, multiple access systems include a Code Division Multiple Access (CDMA) system, a Frequency Division Multiple Access (FDMA) system, a Time Division Multiple Access (TDMA) system, an Orthogonal Frequency Division Multiple Access (OFDMA) system, and a Single Carrier Frequency Division Multiple Access (SC-FDMA) system.

DISCLOSURE OF THE INVENTION

Technical Tasks

An object of the present invention is to provide a method of efficiently supporting D2D relay communication in a wireless access system supporting the D2D relay communication.

Another object of the present invention is to provide a method of determining data to be relayed among D2D data.

The other object of the present invention is to provide devices supporting the aforementioned methods.

It will be appreciated by persons skilled in the art that the objects that could be achieved with the present invention are not limited to what has been particularly described hereinabove and the above and other objects that the present invention could achieve will be more clearly understood from the following detailed description.

TECHNICAL SOLUTION

The present invention relates to methods of efficiently relaying D2D data by utilizing a relay UE (rUE) in a wireless access system supporting D2D communication and a device supporting the methods.

To achieve these and other advantages and in accordance with the purpose of the present invention, as embodied and broadly described, according to one embodiment, a method of relaying D2D data, which is relayed by a relay UE in a wireless access system supporting D2D (device to device) communication, includes the steps of receiving a scheduling allocation (SA) signal to allocate a resource region in which D2D data is transmitted, receiving one or more D2D data, and relaying first D2D data received from an out-of-coverage UE only among the one or more D2D data. In this case, the first D2D data among the one or more D2D data can be detected based on a medium access control header associated with the one or more D2D data and the SA signal.

To further achieve these and other advantages and in accordance with the purpose of the present invention, according to a different embodiment, a relay UE for relaying D2D data in a wireless access system supporting D2D (device to device) communication can include a transmitter, a receiver, and a processor configured to relay the D2D data in a manner of being functionally connected with the transmitter and the receiver.

The processor controls the receiver to receive a scheduling allocation (SA) signal to allocate a resource region in which D2D data is transmitted. The processor controls the receiver to receive one or more D2D data. The processor controls the transmitter to relay first D2D data received from an out-of-coverage UE only among the one or more D2D data. In this case, the first D2D data among the one or more D2D data can be detected based on a medium access control header associated with the one or more D2D data and the SA signal.

In the embodiments of the present invention, the first D2D data is received through the resource region and the resource region may correspond to a resource pool allocated to the out-of-coverage UE.

And, the first D2D data can be received from an out-of-coverage UE synchronized with the relay UE in time and frequency.

And, the SA signal or the first D2D data can include a bit indicating that the first D2D data is transmitted from the out-of-coverage UE.

And, the relay UE can detect the first D2D data based on a demodulation reference signal (DM-RS) defined for transmitting D2D data.

And, the SA signal includes address information of the relay UE, a medium access control header for transmitting the first D2D data includes a destination identifier, and the relay UE can detect D2D data, which is transmitted through the resource region to which the SA signal including the address information of the relay UE is allocated, as the first D2D data and relay the first D2D data to an eNB indicated by the destination identifier.

Or, the SA signal includes a specific address value indicating the resource region configured for the usage of relaying, a medium access control header for transmitting the first D2D data includes a destination identifier, and the relay UE can detect D2D data transmitted through the resource region as the first D2D data and relay the first D2D data to an eNB indicated by the destination identifier.

In the embodiments of the present invention, D2D data transmitted by an out-of-coverage UE can be referred to as first D2D data and D2D data transmitted by an In-NW UE can be referred to as second D2D data.

It is to be understood that both the foregoing general description and the following detailed description of the present invention are exemplary and explanatory and are intended to provide further explanation of the invention as claimed.

Advantageous Effects

As is apparent from the above description, the embodiments of the present invention have the following effects.

Firstly, it is able to efficiently support D2D relay communication in a wireless access system supporting the D2D relay communication.

Secondly, a relay UE is able to determine data to be relayed among received D2D data according to each of methods proposed in the embodiments of the present invention or a combination thereof. In particular, the relay UE can be configured to relay D2D data received from UEs located at the outside of coverage only.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

DESCRIPTION OF DRAWINGS

The accompanying drawings, which are included to provide a further understanding of the invention, illustrate embodiments of the invention and together with the description serve to explain the principle of the invention.

FIG. 9 illustrates one of methods for transmitting SRS used in the embodiments of the present invention.

FIG. 16 is a diagram for a device capable of implementing the methods mentioned earlier in FIGS. 1 to 15.

BEST MODE

Mode for Invention

Figure 1:
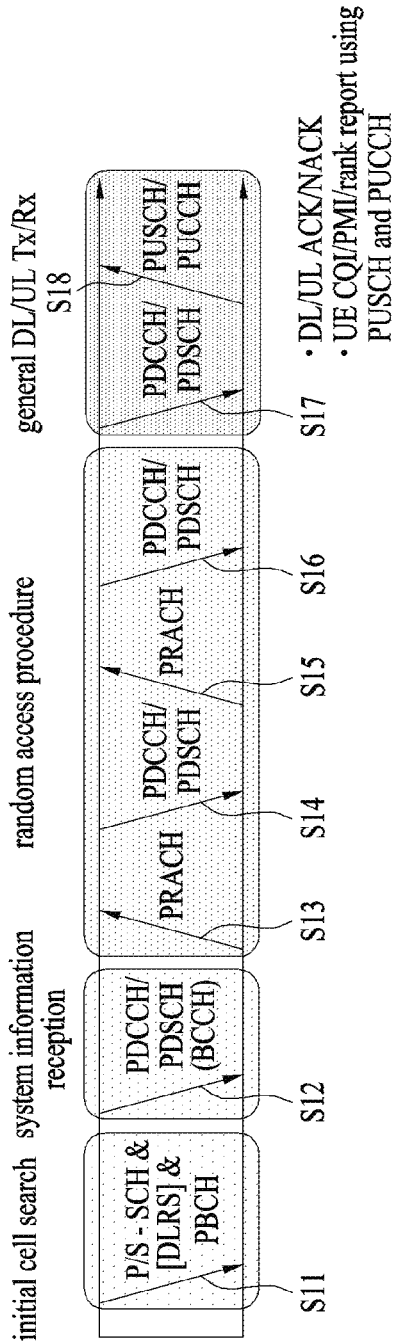
FIG. 1 is a conceptual diagram illustrating physical channels used in the embodiments and a signal transmission method using the physical channels.

Methods of efficiently relaying D2D data by utilizing a relay UE (rUE) and devices supporting the methods are explained in detail in embodiments of the present invention described in the following.

The embodiments of the present disclosure described below are combinations of elements and features of the present disclosure in specific forms. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions or elements of any one embodiment may be included in another embodiment and may be replaced with corresponding constructions or features of another embodiment.

In the description of the attached drawings, a detailed description of known procedures or steps of the present disclosure will be avoided lest it should obscure the subject matter of the present disclosure. In addition, procedures or steps that could be understood to those skilled in the art will not be described either.

Throughout the specification, when a certain portion "includes" or "comprises" a certain component, this indicates that other components are not excluded and may be further included unless otherwise noted. The terms "unit", "-or/er" and "module" described in the specification indicate a unit for processing at least one function or operation, which may be implemented by hardware, software or a combination thereof. In addition, the terms "a or an", "one", "the" etc. may include a singular representation and a plural representation in the context of the present invention (more particularly, in the context of the following claims) unless indicated otherwise in the specification or unless context clearly indicates otherwise.

In the embodiments of the present disclosure, a description is mainly made of a data transmission and reception relationship between a Base Station (BS) and a User Equipment (UE). A BS refers to a terminal node of a network, which directly communicates with a UE. A specific operation described as being performed by the BS may be performed by an upper node of the BS.

Namely, it is apparent that, in a network comprised of a plurality of network nodes including a BS, various operations performed for communication with a UE may be performed by the BS, or network nodes other than the BS. The term 'BS' may be replaced with a fixed station, a Node B, an evolved Node B (eNode B or eNB), an Advanced Base Station (ABS), an access point, etc.

In the embodiments of the present disclosure, the term terminal may be replaced with a UE, a Mobile Station (MS), a Subscriber Station (SS), a Mobile Subscriber Station (MSS), a mobile terminal, an Advanced Mobile Station (AMS), etc.

A transmitter is a fixed and/or mobile node that provides a data service or a voice service and a receiver is a fixed and/or mobile node that receives a data service or a voice service. Therefore, a UE may serve as a transmitter and a BS may serve as a receiver, on an UpLink (UL). Likewise, the UE may serve as a receiver and the BS may serve as a transmitter, on a DownLink (DL).

The embodiments of the present disclosure may be supported by standard specifications disclosed for at least one of wireless access systems including an Institute of Electrical and Electronics Engineers (IEEE) 802.xx system, a 3rd Generation Partnership Project (3GPP) system, a 3GPP Long Term Evolution (LTE) system, and a 3GPP2 system. In particular, the embodiments of the present disclosure may be supported by the standard specifications, 3GPP TS 36.211, 3GPP TS 36.212, 3GPP TS 36.213, 3GPP TS 36.321 and 3GPP TS 36.331. That is, the steps or parts, which are not described to clearly reveal the technical idea of the present disclosure, in the embodiments of the present disclosure may be explained by the above standard specifications. All terms used in the embodiments of the present disclosure may be explained by the standard specifications.

Reference will now be made in detail to the embodiments of the present disclosure with reference to the accompanying drawings. The detailed description, which will be given below with reference to the accompanying drawings, is intended to explain exemplary embodiments of the present disclosure, rather than to show the only embodiments that can be implemented according to the invention.

The following detailed description includes specific terms in order to provide a thorough understanding of the present disclosure. However, it will be apparent to those skilled in the art that the specific terms may be replaced with other terms without departing the technical spirit and scope of the present disclosure.

For example, a relay UE corresponds to a UE configured to relay D2D data/signal for a general UE to an eNB, a general UE and/or a different UE. In this case, the relay UE and the general UE can be referred to as a first UE and a second UE, respectively.

A scheduling allocation signal used in the embodiments of the present invention can be transmitted through PSCCH (physical sidelink control channel). And, the SA can be used as a same meaning with the PSCCH.

Hereinafter, 3GPP LTE/LTE-A systems are explained, which are examples of wireless access systems.

The embodiments of the present disclosure can be applied to various wireless access systems such as Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), etc. CDMA may be implemented as a radio technology such as Universal Terrestrial Radio Access (UTRA) or CDMA2000. TDMA may be implemented as a radio technology such as Global System for Mobile communications (GSM)/General packet Radio Service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, Evolved UTRA (E-UTRA), etc.

UTRA is a part of Universal Mobile Telecommunications System (UMTS). 3GPP LTE is a part of Evolved UMTS (E-UMTS) using E-UTRA, adopting OFDMA for DL and SC-FDMA for UL. LTE-Advanced (LTE-A) is an evolution of 3GPP LTE. While the embodiments of the present disclosure are described in the context of a 3GPP LTE/LTE-A system in order to clarify the technical features of the present disclosure, the present disclosure is also applicable to an IEEE 802.16e/m system, etc.

1. 3GPP LTE/LTE-A System

In a wireless access system, a UE receives information from an eNB on a DL and transmits information to the eNB on a UL. The information transmitted and received between the UE and the eNB includes general data information and various types of control information. There are many physical channels according to the types/usages of information transmitted and received between the eNB and the UE.

1.1 System Overview

FIG. 1 illustrates physical channels and a general method using the physical channels, which may be used in embodiments of the present disclosure.

When a UE is powered on or enters a new cell, the UE performs initial cell search (S11). The initial cell search involves acquisition of synchronization to an eNB. Specifically, the UE synchronizes its timing to the eNB and acquires information such as a cell Identifier (ID) by receiving a Primary Synchronization Channel (P-SCH) and a Secondary Synchronization Channel (S-SCH) from the eNB.

Then the UE may acquire information broadcast in the cell by receiving a Physical Broadcast Channel (PBCH) from the eNB.

During the initial cell search, the UE may monitor a DL channel state by receiving a Downlink Reference Signal (DL RS).

After the initial cell search, the UE may acquire more detailed system information by receiving a Physical Downlink Control Channel (PDCCH) and receiving a Physical Downlink Shared Channel (PDSCH) based on information of the PDCCH (S12).

To complete connection to the eNB, the UE may perform a random access procedure with the eNB (S13 to S16). In the random access procedure, the UE may transmit a preamble on a Physical Random Access Channel (PRACH) (S13) and may receive a PDCCH and a PDSCH associated with the PDCCH (S14). In the case of contention-based random access, the UE may additionally perform a contention resolution procedure including transmission of an additional PRACH (S15) and reception of a PDCCH signal and a PDSCH signal corresponding to the PDCCH signal (S16).

After the above procedure, the UE may receive a PDCCH and/or a PDSCH from the eNB (S17) and transmit a Physical Uplink Shared Channel (PUSCH) and/or a Physical Uplink Control Channel (PUCCH) to the eNB (S18), in a general UL/DL signal transmission procedure.

Control information that the UE transmits to the eNB is generically called Uplink Control Information (UCI). The UCI includes a Hybrid Automatic Repeat and reQuest Acknowledgement/Negative Acknowledgement (HARQ-ACK/NACK), a Scheduling Request (SR), a Channel Quality Indicator (CQI), a Precoding Matrix Index (PMI), a Rank Indicator (RI), etc.

In the LTE system, UCI is generally transmitted on a PUCCH periodically. However, if control information and traffic data should be transmitted simultaneously, the control information and traffic data may be transmitted on a PUSCH. In addition, the UCI may be transmitted aperiodically on the PUSCH, upon receipt of a request/command from a network.

Figure 2:
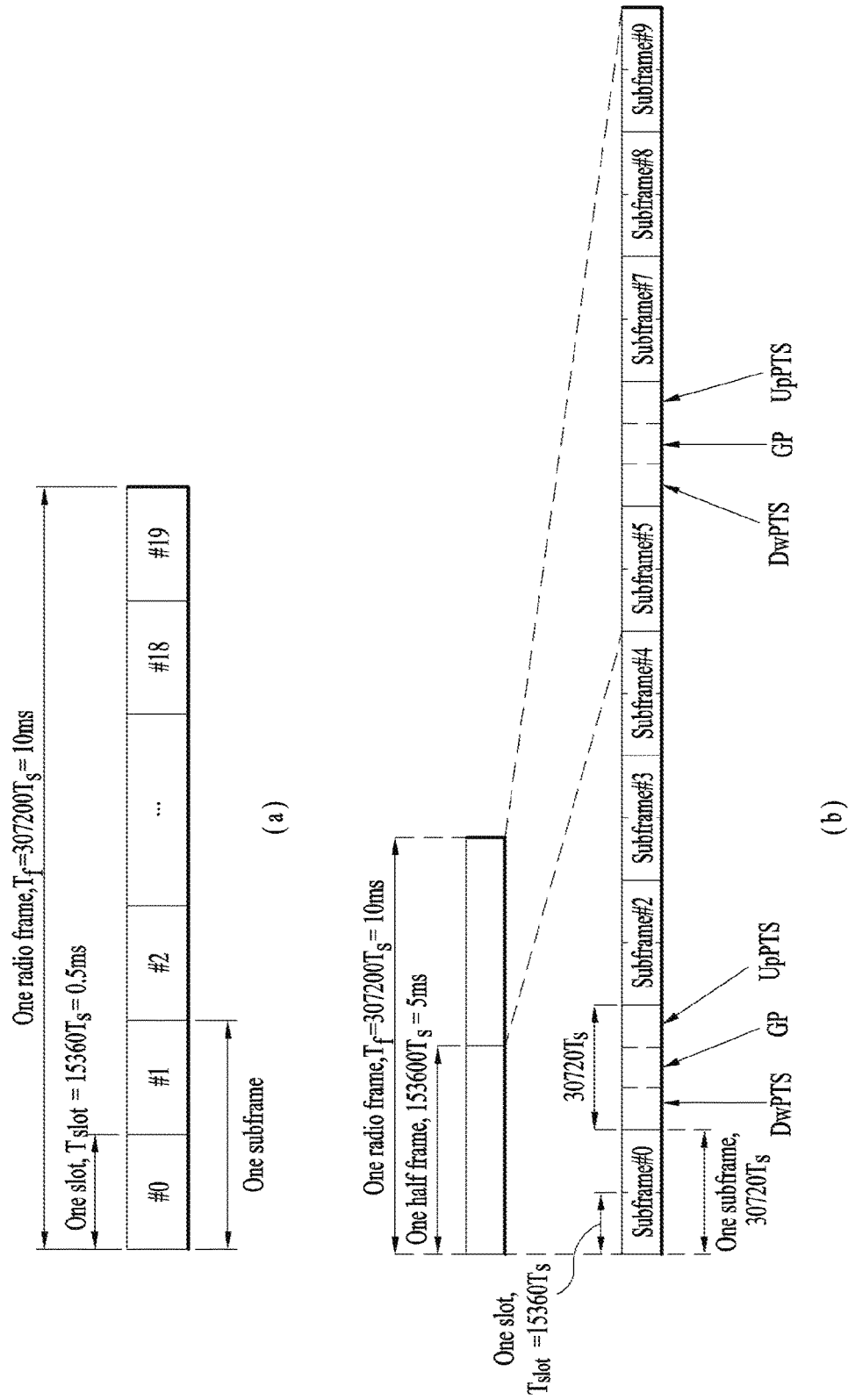
FIG. 2 is a diagram illustrating a structure of a radio frame for use in the embodiments.

FIG. 2 illustrates exemplary radio frame structures used in embodiments of the present disclosure.

FIG. 2(a) illustrates frame structure type 1. Frame structure type 1 is applicable to both a full Frequency Division Duplex (FDD) system and a half FDD system.

One radio frame is 10 ms (Tf=307200·Ts) long, including equal-sized 20 slots indexed from 0 to 19. Each slot is 0.5 ms (Tslot=15360·Ts) long. One subframe includes two successive slots. An ith subframe includes 2ith and (2i+1)th slots. That is, a radio frame includes 10 subframes. A time required for transmitting one subframe is defined as a Transmission Time Interval (TTI). Ts is a sampling time given as Ts=1/(15 kHz×2048)=3.2552×10−8 (about 33 ns). One slot includes a plurality of Orthogonal Frequency Division Multiplexing (OFDM) symbols or SC-FDMA symbols in the time domain by a plurality of Resource Blocks (RBs) in the frequency domain.

A slot includes a plurality of OFDM symbols in the time domain. Since OFDMA is adopted for DL in the 3GPP LTE system, one OFDM symbol represents one symbol period. An OFDM symbol may be called an SC-FDMA symbol or symbol period. An RB is a resource allocation unit including a plurality of contiguous subcarriers in one slot.

In a full FDD system, each of 10 subframes may be used simultaneously for DL transmission and UL transmission during a 10-ms duration. The DL transmission and the UL transmission are distinguished by frequency. On the other hand, a UE cannot perform transmission and reception simultaneously in a half FDD system.

The above radio frame structure is purely exemplary. Thus, the number of subframes in a radio frame, the number of slots in a subframe, and the number of OFDM symbols in a slot may be changed.

FIG. 2(b) illustrates frame structure type 2. Frame structure type 2 is applied to a Time Division Duplex (TDD) system. One radio frame is 10 ms (Tf=307200·Ts) long, including two half-frames each having a length of 5 ms (=153600·Ts) long. Each half-frame includes five subframes each being 1 ms (=30720·Ts) long. An ith subframe includes 2ith and (2i+1)th slots each having a length of 0.5 ms (Tslot=15360·Ts). Ts is a sampling time given as Ts=1/(15 kHz×2048)=3.2552×10−8 (about 33 ns).

A type-2 frame includes a special subframe having three fields, Downlink Pilot Time Slot (DwPTS), Guard Period (GP), and Uplink Pilot Time Slot (UpPTS). The DwPTS is used for initial cell search, synchronization, or channel estimation at a UE, and the UpPTS is used for channel estimation and UL transmission synchronization with a UE at an eNB. The GP is used to cancel UL interference between a UL and a DL, caused by the multi-path delay of a DL signal.

[Table 1] below lists special subframe configurations (DwPTS/GP/UpPTS lengths).

region. To maintain a single carrier property, a UE does not transmit a PUCCH and a PUSCH simultaneously. A pair of RBs in a subframe are allocated to a PUCCH for a UE. The RBs of the RB pair occupy different subcarriers in two slots. Thus it is said that the RB pair frequency-hops over a slot boundary.

Figure 5:
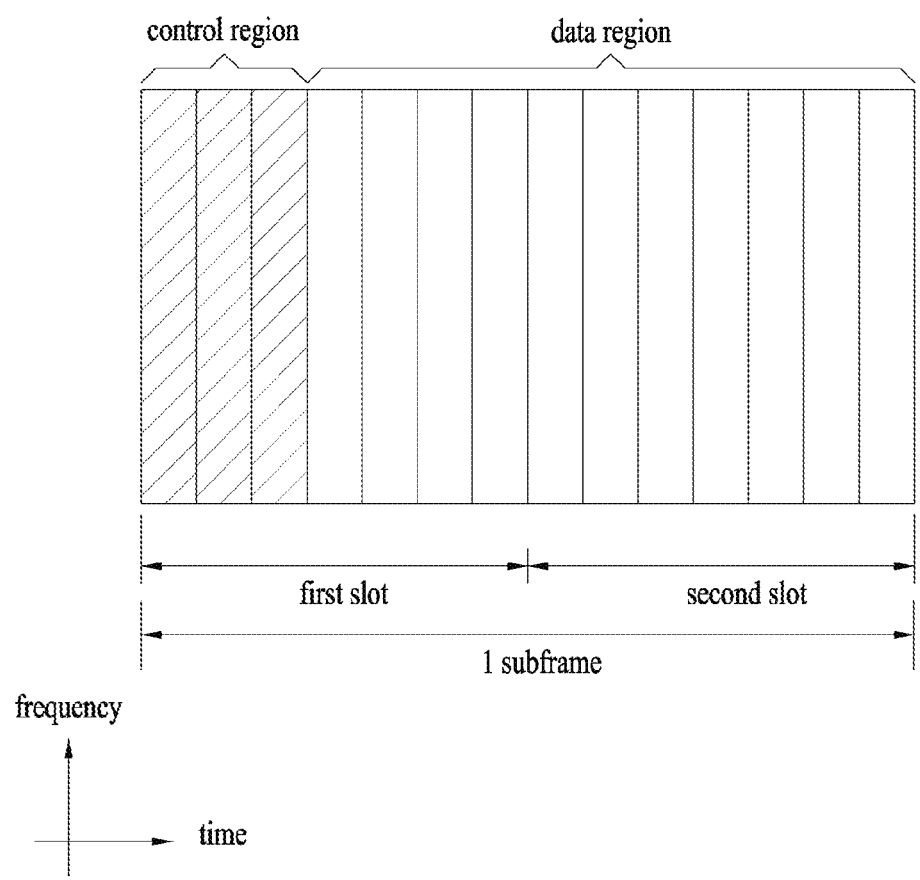
FIG. 5 is a diagram illustrating a structure of a downlink subframe according to the embodiments.

FIG. 5 illustrates a structure of a DL subframe that may be used in embodiments of the present disclosure.

Referring to FIG. 5, up to three OFDM symbols of a DL subframe, starting from OFDM symbol 0 are used as a control region to which control channels are allocated and the other OFDM symbols of the DL subframe are used as a data region to which a PDSCH is allocated. DL control channels defined for the 3GPP LTE system include a Physical Control Format Indicator Channel (PCFICH), a PDCCH, and a Physical Hybrid ARQ Indicator Channel (PHICH).

The PCFICH is transmitted in the first OFDM symbol of a subframe, carrying information about the number of OFDM symbols used for transmission of control channels (i.e. the size of the control region) in the subframe. The PHICH is a response channel to a UL transmission, delivering an HARQ ACK/NACK signal. Control information carried on the PDCCH is called Downlink Control Information (DCI). The DCI transports UL resource assignment information, DL resource assignment information, or UL Transmission (Tx) power control commands for a UE group.

TABLE 1

| | Normal cyclic prefix in downlink | | | Extended cyclic prefix in downlink | | |
|---|---|---|---|---|---|---|
| | | UpPTS | | | UpPTS | |
| Special subframe configuration | DwPTS | Normal cyclic prefix in uplink | Extended cyclic prefix in uplink | DwPTS | Normal cyclic prefix in uplink | Extended cyclic prefix in uplink |
| 0 | 6592 · $T_s$ | 2192 · $T_s$ | 2560 · $T_s$ | 7680 · $T_s$ | 2192 · $T_s$ | 2560 · $T_s$ |
| 1 | 19760 · $T_s$ | | | 20480 · $T_s$ | | |
| 2 | 21952 · $T_s$ | | | 23040 · $T_s$ | | |
| 3 | 24144 · $T_s$ | | | 25600 · $T_s$ | | |
| 4 | 26336 · $T_s$ | | | 7680 · $T_s$ | 4384 · $T_s$ | 5120 · $T_s$ |
| 5 | 6592 · $T_s$ | 4384 · $T_s$ | 5120 · $T_s$ | 20480 · $T_s$ | | |
| 6 | 19760 · $T_s$ | | | 23040 · $T_s$ | | |
| 7 | 21952 · $T_s$ | | | — | — | — |
| 8 | 24144 · $T_s$ | | | — | — | — |

Figure 3:
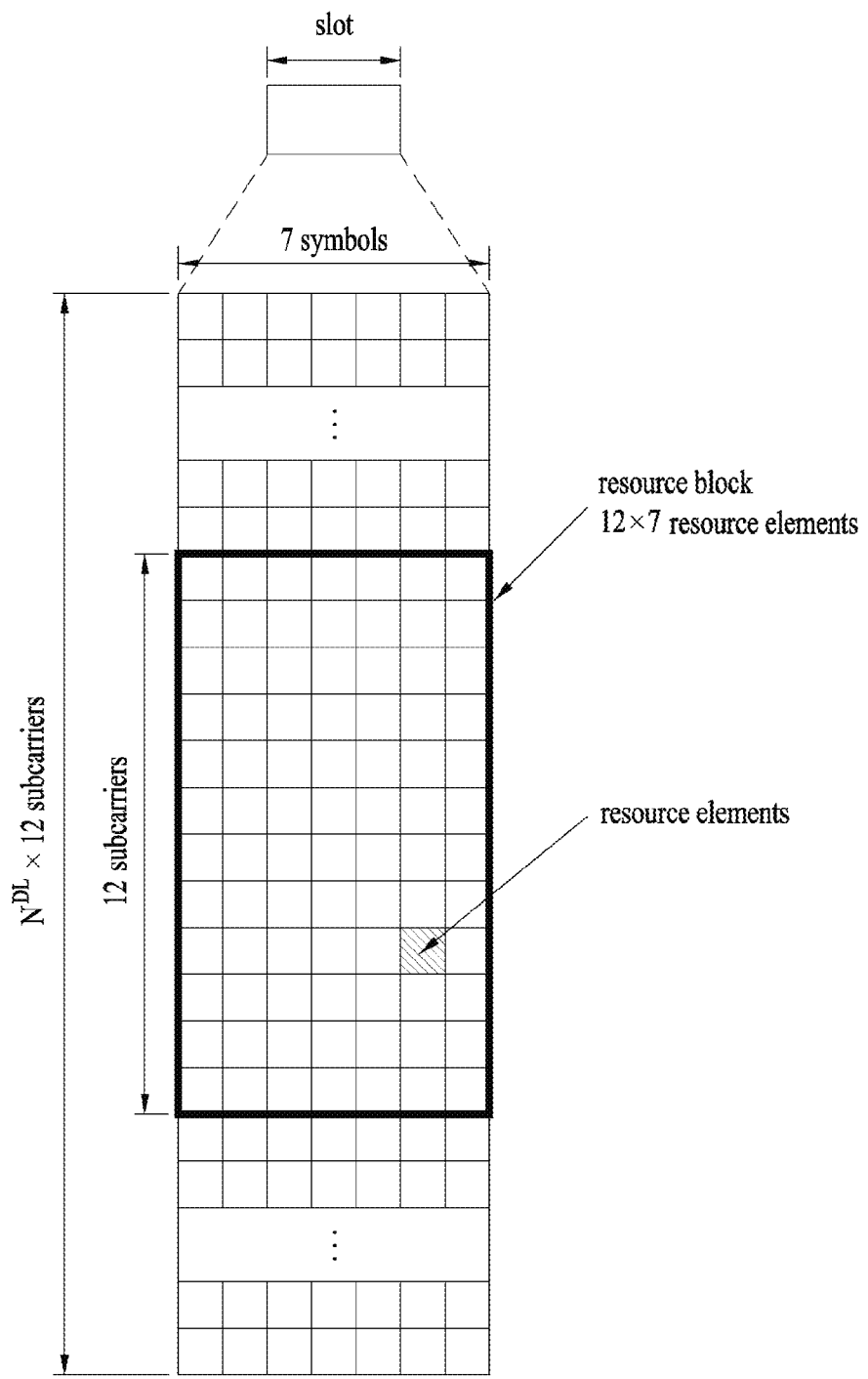
FIG. 3 is a diagram illustrating an example of a resource grid of a downlink slot according to the embodiments.

FIG. 3 illustrates an exemplary structure of a DL resource grid for the duration of one DL slot, which may be used in embodiments of the present disclosure.

Referring to FIG. 3, a DL slot includes a plurality of OFDM symbols in the time domain. One DL slot includes 7 OFDM symbols in the time domain and an RB includes 12 subcarriers in the frequency domain, to which the present disclosure is not limited.

Each element of the resource grid is referred to as a Resource Element (RE). An RB includes 12×7 REs. The number of RBs in a DL slot, NDL depends on a DL transmission bandwidth. A UL slot may have the same structure as a DL slot.

Figure 4:
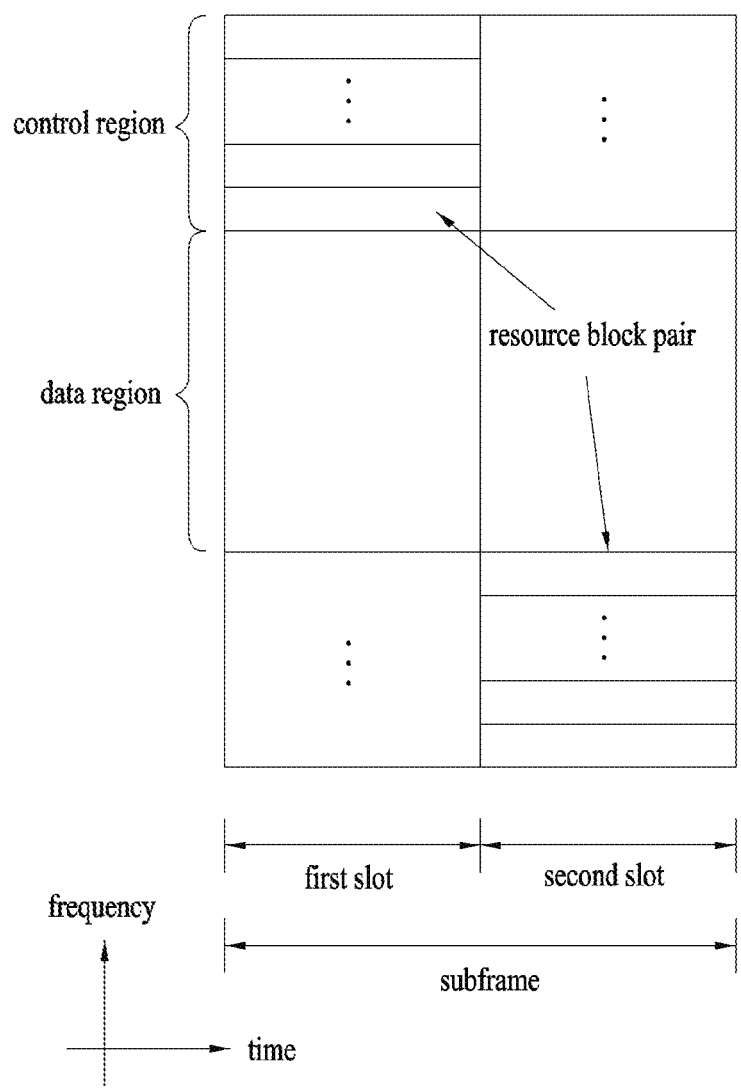
FIG. 4 is a diagram illustrating a structure of an uplink subframe according to the embodiments.

FIG. 4 illustrates a structure of a UL subframe which may be used in embodiments of the present disclosure.

Referring to FIG. 4, a UL subframe may be divided into a control region and a data region in the frequency domain. A PUCCH carrying UCI is allocated to the control region and a PUSCH carrying user data is allocated to the data 1.2 Physical Downlink Control Channel (PDCCH)

1.2.1 PDCCH Overview

The PDCCH may deliver information about resource allocation and a transport format for a Downlink Shared Channel (DL-SCH) (i.e. a DL grant), information about resource allocation and a transport format for an Uplink Shared Channel (UL-SCH) (i.e. a UL grant), paging information of a Paging Channel (PCH), system information on the DL-SCH, information about resource allocation for a higher-layer control message such as a random access response transmitted on the PDSCH, a set of Tx power control commands for individual UEs of a UE group, Voice Over Internet Protocol (VoIP) activation indication information, etc.

A plurality of PDCCHs may be transmitted in the control region. A UE may monitor a plurality of PDCCHs. A PDCCH is transmitted in an aggregate of one or more consecutive Control Channel Elements (CCEs). A PDCCH made up of one or more consecutive CCEs may be transmitted in the control region after subblock interleaving. A CCE is a logical allocation unit used to provide a PDCCH at a code rate based on the state of a radio channel. A CCE includes a plurality of RE Groups (REGs). The format of a PDCCH and the number of available bits for the PDCCH are determined according to the relationship between the number of CCEs and a code rate provided by the CCEs.

1.2.2 PDCCH Structure

A plurality of PDCCHs for a plurality of UEs may be multiplexed and transmitted in the control region. A PDCCH is made up of an aggregate of one or more consecutive CCEs. A CCE is a unit of 9 REGs each REG including 4 REs. Four Quadrature Phase Shift Keying (QPSK) symbols are mapped to each REG. REs occupied by RSs are excluded from REGs. That is, the total number of REGs in an OFDM symbol may be changed depending on the presence or absence of a cell-specific RS. The concept of an REG to which four REs are mapped is also applicable to other DL control channels (e.g. the PCFICH or the PHICH). Let the number of REGs that are not allocated to the PCFICH or the PHICH be denoted by NREG. Then the number of CCEs available to the system is NCCE ($=\lfloor N_{REG}/9 \rfloor$) and the CCEs are indexed from 0 to NCCE-1.

To simplify the decoding process of a UE, a PDCCH format including n CCEs may start with a CCE having an index equal to a multiple of n. That is, given CCE i, the PDCCH format may start with a CCE satisfying i mod n=0.

The eNB may configure a PDCCH with 1, 2, 4, or 8 CCEs. {1, 2, 4, 8} are called CCE aggregation levels. The number of CCEs used for transmission of a PDCCH is determined according to a channel state by the eNB. For example, one CCE is sufficient for a PDCCH directed to a UE in a good DL channel state (a UE near to the eNB). On the other hand, 8 CCEs may be required for a PDCCH directed to a UE in a poor DL channel state (a UE at a cell edge) in order to ensure sufficient robustness.

[Table 2] below illustrates PDCCH formats. 4 PDCCH formats are supported according to CCE aggregation levels as illustrated in [Table 2].

TABLE 2

| PDCCH format | Number of CCE (n) | Number of REG | Number of PDCCH bits |
|---|---|---|---|
| 0 | 1 | 9 | 72 |
| 1 | 2 | 18 | 144 |
| 2 | 4 | 36 | 288 |
| 3 | 8 | 72 | 576 |

A different CCE aggregation level is allocated to each UE because the format or Modulation and Coding Scheme (MCS) level of control information delivered in a PDCCH for the UE is different. An MCS level defines a code rate used for data coding and a modulation order. An adaptive MCS level is used for link adaptation. In general, three or four MCS levels may be considered for control channels carrying control information.

Regarding the formats of control information, control information transmitted on a PDCCH is called DCI. The configuration of information in PDCCH payload may be changed depending on the DCI format. The PDCCH payload is information bits. [Table 3] lists DCI according to DCI formats.

TABLE 3

| DCI Format | Description |
|---|---|
| Format 0 | Resource grants for the PUSCH transmissions (uplink) |

TABLE 3-continued

| DCI Format | Description |
|---|---|
| Format 1 | Resource assignments for single codeword PDSCH transmission (transmission modes 1, 2 and 7) |
| Format 1A | Compact signaling of resource assignments for sigle codeword PDSCH (all modes) |
| Format 1B | Compact resource assignments for PDSCH using rank-1 closed loop precoding (mode 6) |
| Format 1C | Very compact resource assignments for PDSCH (e.g., paging/broadcast system information) |
| Format 1D | Compact resource assignments for PDSCH using multi-user MIMO(mode 5) |
| Format 2 | Resource assignments for PDSCH for closed loop MIMO operation (mode 4) |
| Format 2A | resource assignments for PDSCH for open loop MIMO operation (mode 3) |
| Format 3/3A | Power control commands for PUCCH and PUSCH with 2-bit/1-bit power adjustment |
| Format 4 | Scheduling of PUSCH in one UL cell with multi-antenna port transmission mode |

Referring to [Table 3], the DCI formats include Format 0 for PUSCH scheduling, Format 1 for single-codeword PDSCH scheduling, Format 1A for compact single-codeword PDSCH scheduling, Format 1C for very compact DL-SCH scheduling, Format 2 for PDSCH scheduling in a closed-loop spatial multiplexing mode, Format 2A for PDSCH scheduling in an open-loop spatial multiplexing mode, and Format 3/3A for transmission of Transmission Power Control (TPC) commands for uplink channels. DCI Format 1A is available for PDSCH scheduling irrespective of the transmission mode of a UE.

The length of PDCCH payload may vary with DCI formats. In addition, the type and length of PDCCH payload may be changed depending on compact or non-compact scheduling or the transmission mode of a UE.

The transmission mode of a UE may be configured for DL data reception on a PDSCH at the UE. For example, DL data carried on a PDSCH includes scheduled data, a paging message, a random access response, broadcast information on a BCCH, etc. for a UE. The DL data of the PDSCH is related to a DCI format signaled through a PDCCH. The transmission mode may be configured semi-statically for the UE by higher-layer signaling (e.g. Radio Resource Control (RRC) signaling). The transmission mode may be classified as single antenna transmission or multi-antenna transmission.

A transmission mode is configured for a UE semi-statically by higher-layer signaling. For example, multi-antenna transmission scheme may include transmit diversity, open-loop or closed-loop spatial multiplexing, Multi-User Multiple Input Multiple Output (MU-MIMO), or beamforming. Transmit diversity increases transmission reliability by transmitting the same data through multiple Tx antennas. Spatial multiplexing enables high-speed data transmission without increasing a system bandwidth by simultaneously transmitting different data through multiple Tx antennas. Beamforming is a technique of increasing the Signal to Interference plus Noise Ratio (SINR) of a signal by weighting multiple antennas according to channel states.

A DCI format for a UE depends on the transmission mode of the UE. The UE has a reference DCI format monitored according to the transmission mode configure for the UE. The following 10 transmission modes are available to UEs:

(1) Transmission mode 1: Single antenna port (port 0);

(2) Transmission mode 2: Transmit diversity;

(3) Transmission mode 3: Open-loop spatial multiplexing when the number of layer is larger than 1 or Transmit diversity when the rank is 1;

(4) Transmission mode 4: Closed-loop spatial multiplexing;

(5) Transmission mode 5: MU-MIMO;

(6) Transmission mode 6: Closed-loop rank-1 precoding;

(7) Transmission mode 7: Precoding supporting a single layer transmission, which is not based on a codebook (Rel-8);

(8) Transmission mode 8: Precoding supporting up to two layers, which are not based on a codebook (Rel-9);

(9) Transmission mode 9: Precoding supporting up to eight layers, which are not based on a codebook (Rel-10); and

(10) Transmission mode 10: Precoding supporting up to eight layers, which are not based on a codebook, used for CoMP (Rel-11).

1.2.3 PDCCH Transmission

The eNB determines a PDCCH format according to DCI that will be transmitted to the UE and adds a Cyclic Redundancy Check (CRC) to the control information. The CRC is masked by a unique Identifier (ID) (e.g. a Radio Network Temporary Identifier (RNTI)) according to the owner or usage of the PDCCH. If the PDCCH is destined for a specific UE, the CRC may be masked by a unique ID (e.g. a cell-RNTI (C-RNTI)) of the UE. If the PDCCH carries a paging message, the CRC of the PDCCH may be masked by a paging indicator ID (e.g. a Paging-RNTI (P-RNTI)). If the PDCCH carries system information, particularly, a System Information Block (SIB), its CRC may be masked by a system information ID (e.g. a System Information RNTI (SI-RNTI)). To indicate that the PDCCH carries a random access response to a random access preamble transmitted by a UE, its CRC may be masked by a Random Access-RNTI (RA-RNTI).

Then, the eNB generates coded data by channel-encoding the CRC-added control information. The channel coding may be performed at a code rate corresponding to an MCS level. The eNB rate-matches the coded data according to a CCE aggregation level allocated to a PDCCH format and generates modulation symbols by modulating the coded data. Herein, a modulation order corresponding to the MCS level may be used for the modulation. The CCE aggregation level for the modulation symbols of a PDCCH may be one of 1, 2, 4, and 8. Subsequently, the eNB maps the modulation symbols to physical REs (i.e. CCE to RE mapping).

1.2.4 Blind Decoding (BD)

A plurality of PDCCHs may be transmitted in a subframe. That is, the control region of a subframe includes a plurality of CCEs, CCE 0 to CCE $N_{CCE,k-1}$. $N_{CCE,k}$ is the total number of CCEs in the control region of a kth subframe. A UE monitors a plurality of PDCCHs in every subframe. This means that the UE attempts to decode each PDCCH according to a monitored PDCCH format.

The eNB does not provide the UE with information about the position of a PDCCH directed to the UE in an allocated control region of a subframe. Without knowledge of the position, CCE aggregation level, or DCI format of its PDCCH, the UE searches for its PDCCH by monitoring a set of PDCCH candidates in the subframe in order to receive a control channel from the eNB. This is called blind decoding. Blind decoding is the process of demasking a CRC part with a UE ID, checking a CRC error, and determining whether a corresponding PDCCH is a control channel directed to a UE by the UE.

The UE monitors a PDCCH in every subframe to receive data transmitted to the UE in an active mode. In a Discontinuous Reception (DRX) mode, the UE wakes up in a monitoring interval of every DRX cycle and monitors a PDCCH in a subframe corresponding to the monitoring interval. The PDCCH-monitored subframe is called a non-DRX subframe.

To receive its PDCCH, the UE should blind-decode all CCEs of the control region of the non-DRX subframe. Without knowledge of a transmitted PDCCH format, the UE should decode all PDCCHs with all possible CCE aggregation levels until the UE succeeds in blind-decoding a PDCCH in every non-DRX subframe. Since the UE does not know the number of CCEs used for its PDCCH, the UE should attempt detection with all possible CCE aggregation levels until the UE succeeds in blind decoding of a PDCCH.

In the LTE system, the concept of Search Space (SS) is defined for blind decoding of a UE. An SS is a set of PDCCH candidates that a UE will monitor. The SS may have a different size for each PDCCH format. There are two types of SSs, Common Search Space (CSS) and UE-specific/Dedicated Search Space (USS).

While all UEs may know the size of a CSS, a USS may be configured for each individual UE. Accordingly, a UE should monitor both a CSS and a USS to decode a PDCCH. As a consequence, the UE performs up to 44 blind decodings in one subframe, except for blind decodings based on different CRC values (e.g., C-RNTI, P-RNTI, SI-RNTI, and RA-RNTI).

In view of the constraints of an SS, the eNB may not secure CCE resources to transmit PDCCHs to all intended UEs in a given subframe. This situation occurs because the remaining resources except for allocated CCEs may not be included in an SS for a specific UE. To minimize this obstacle that may continue in the next subframe, a UE-specific hopping sequence may apply to the starting point of a USS.

[Table 4] illustrates the sizes of CSSs and USSs.

TABLE 4

| PDCCH format | Number of CCE (n) | Number of candidates in CSS | Number of candidates in USS |
|---|---|---|---|
| 0 | 1 | — | 6 |
| 1 | 2 | — | 6 |
| 2 | 4 | 4 | 2 |
| 3 | 8 | 2 | 2 |

To mitigate the load of the UE caused by the number of blind decoding attempts, the UE does not search for all defined DCI formats simultaneously. Specifically, the UE always searches for DCI Format 0 and DCI Format 1A in a USS. Although DCI Format 0 and DCI Format 1A are of the same size, the UE may distinguish the DCI formats by a flag for format 0/format 1a differentiation included in a PDCCH. Other DCI formats than DCI Format 0 and DCI Format 1A, such as DCI Format 1, DCI Format 1B, and DCI Format 2 may be required for the UE.

The UE may search for DCI Format 1A and DCI Format 1C in a CSS. The UE may also be configured to search for DCI Format 3 or 3A in the CSS. Although DCI Format 3 and DCI Format 3A have the same size as DCI Format 0 and DCI Format 1A, the UE may distinguish the DCI formats by a CRC scrambled with an ID other than a UE-specific ID.

An SS $S_k^{(L)}$ is a PDCCH candidate set with a CCE aggregation level $L \in \{1, 2, 4, 8\}$. The CCEs of PDCCH candidate set m in the SS may be determined by the following equation.

$$L \cdot \{(Y_k+m) \bmod \lfloor N_{CCE,k}/L \rfloor\}+i \quad \text{[Equation 1]}$$

where $M^{(L)}$ is the number of PDCCH candidates with CCE aggregation level L to be monitored in the SS, m=0, ..., $M^{(L)}-1$, i is the index of a CCE in each PDCCH candidate, and i=0, ..., L−1. $k=\lfloor n_s/2 \rfloor$ where $n_s$ is the index of a slot in a radio frame.

As described before, the UE monitors both the USS and the CSS to decode a PDCCH. The CSS supports PDCCHs with CCE aggregation levels {4, 8} and the USS supports PDCCHs with CCE aggregation levels {1, 2, 4, 8}. [Table 5] illustrates PDCCH candidates monitored by a UE.

TABLE 5

| Type | Search space $S_k^{(L)}$ | | Number of PDCCH candidates $M^{(L)}$ |
|---|---|---|---|
| | Aggregation level L | Size [in CCEs] | |
| UE-specific | 1 | 6 | 6 |
| | 2 | 12 | 6 |
| | 4 | 8 | 2 |
| | 8 | 16 | 2 |
| Common | 4 | 16 | 4 |
| | 8 | 16 | 2 |

Referring to [Equation 1], for two aggregation levels, L=4 and L=8, $Y_k$ is set to 0 in the CSS, whereas $Y_k$ is defined by [Equation 2] for aggregation level L in the USS.

$$Y_k=(A \cdot Y_{k-1}) \bmod D \quad \text{[Equation 2]}$$

where $Y_{-1}=n_{RNTI} \neq 0$, $n_{RNTI}$ indicating an RNTI value. A=39827 and D=65537.

2. Carrier Aggregation (CA) Environment 2.1 CA Overview

A 3GPP LTE system (conforming to Rel-8 or Rel-9) (hereinafter, referred to as an LTE system) uses Multi-Carrier Modulation (MCM) in which a single Component Carrier (CC) is divided into a plurality of bands. In contrast, a 3GPP LTE-A system (hereinafter, referred to an LTE-A system) may use CA by aggregating one or more CCs to support a broader system bandwidth than the LTE system. The term CA is interchangeably used with carrier combining, multi-CC environment, or multi-carrier environment.

In the present disclosure, multi-carrier means CA (or carrier combining). Herein, CA covers aggregation of contiguous carriers and aggregation of non-contiguous carriers. The number of aggregated CCs may be different for a DL and a UL. If the number of DL CCs is equal to the number of UL CCs, this is called symmetric aggregation. If the number of DL CCs is different from the number of UL CCs, this is called asymmetric aggregation. The term CA is interchangeable with carrier combining, bandwidth aggregation, spectrum aggregation, etc.

The LTE-A system aims to support a bandwidth of up to 100 MHz by aggregating two or more CCs, that is, by CA. To guarantee backward compatibility with a legacy IMT system, each of one or more carriers, which has a smaller bandwidth than a target bandwidth, may be limited to a bandwidth used in the legacy system.

For example, the legacy 3GPP LTE system supports bandwidths {1.4, 3, 5, 10, 15, and 20 MHz} and the 3GPP LTE-A system may support a broader bandwidth than 20 MHz using these LTE bandwidths. A CA system of the present disclosure may support CA by defining a new bandwidth irrespective of the bandwidths used in the legacy system.

There are two types of CA, intra-band CA and inter-band CA. Intra-band CA means that a plurality of DL CCs and/or UL CCs are successive or adjacent in frequency. In other words, the carrier frequencies of the DL CCs and/or UL CCs are positioned in the same band. On the other hand, an environment where CCs are far away from each other in frequency may be called inter-band CA. In other words, the carrier frequencies of a plurality of DL CCs and/or UL CCs are positioned in different bands. In this case, a UE may use a plurality of Radio Frequency (RF) ends to conduct communication in a CA environment.

The LTE-A system adopts the concept of cell to manage radio resources. The above-described CA environment may be referred to as a multi-cell environment. A cell is defined as a pair of DL and UL CCs, although the UL resources are not mandatory. Accordingly, a cell may be configured with DL resources alone or DL and UL resources.

For example, if one serving cell is configured for a specific UE, the UE may have one DL CC and one UL CC. If two or more serving cells are configured for the UE, the UE may have as many DL CCs as the number of the serving cells and as many UL CCs as or fewer UL CCs than the number of the serving cells, or vice versa. That is, if a plurality of serving cells are configured for the UE, a CA environment using more UL CCs than DL CCs may also be supported.

CA may be regarded as aggregation of two or more cells having different carrier frequencies (center frequencies). Herein, the term 'cell' should be distinguished from 'cell' as a geographical area covered by an eNB. Hereinafter, intra-band CA is referred to as intra-band multi-cell and inter-band CA is referred to as inter-band multi-cell.

In the LTE-A system, a Primacy Cell (PCell) and a Secondary Cell (SCell) are defined. A PCell and an SCell may be used as serving cells. For a UE in RRC_CONNECTED state, if CA is not configured for the UE or the UE does not support CA, a single serving cell including only a PCell exists for the UE. On the contrary, if the UE is in RRC_CONNECTED state and CA is configured for the UE, one or more serving cells may exist for the UE, including a PCell and one or more SCells.

Serving cells (PCell and SCell) may be configured by an RRC parameter. A physical-layer ID of a cell, PhysCellId is an integer value ranging from 0 to 503. A short ID of an SCell, SCellIndex is an integer value ranging from 1 to 7. A short ID of a serving cell (PCell or SCell), ServeCellIndex is an integer value ranging from 1 to 7. If ServeCellIndex is 0, this indicates a PCell and the values of ServeCellIndex for SCells are pre-assigned. That is, the smallest cell ID (or cell index) of ServeCellIndex indicates a PCell.

A PCell refers to a cell operating in a primary frequency (or a primary CC). A UE may use a PCell for initial connection establishment or connection reestablishment. The PCell may be a cell indicated during handover. In addition, the PCell is a cell responsible for control-related communication among serving cells configured in a CA environment. That is, PUCCH allocation and transmission for the UE may take place only in the PCell. In addition, the UE may use only the PCell in acquiring system information or changing a monitoring procedure. An Evolved Universal Terrestrial Radio Access Network (E-UTRAN) may change only a PCell for a handover procedure by a higher-layer RRCConnectionReconfiguration message including mobilityControlInfo to a UE supporting CA.

An SCell may refer to a cell operating in a secondary frequency (or a secondary CC). Although only one PCell is allocated to a specific UE, one or more SCells may be allocated to the UE. An SCell may be configured after RRC connection establishment and may be used to provide additional radio resources. There is no PUCCH in cells other than a PCell, that is, in SCells among serving cells configured in the CA environment.

When the E-UTRAN adds an SCell to a UE supporting CA, the E-UTRAN may transmit all system information related to operations of related cells in RRC_CONNECTED state to the UE by dedicated signaling. Changing system information may be controlled by releasing and adding a related SCell. Herein, a higher-layer RRCConnectionReconfiguration message may be used. The E-UTRAN may transmit a dedicated signal having a different parameter for each cell rather than it broadcasts in a related SCell.

After an initial security activation procedure starts, the E-UTRAN may configure a network including one or more SCells by adding the SCells to a PCell initially configured during a connection establishment procedure. In the CA environment, each of a PCell and an SCell may operate as a CC. Hereinbelow, a Primary CC (PCC) and a PCell may be used in the same meaning and a Secondary CC (SCC) and an SCell may be used in the same meaning in embodiments of the present disclosure.

Figure 6:
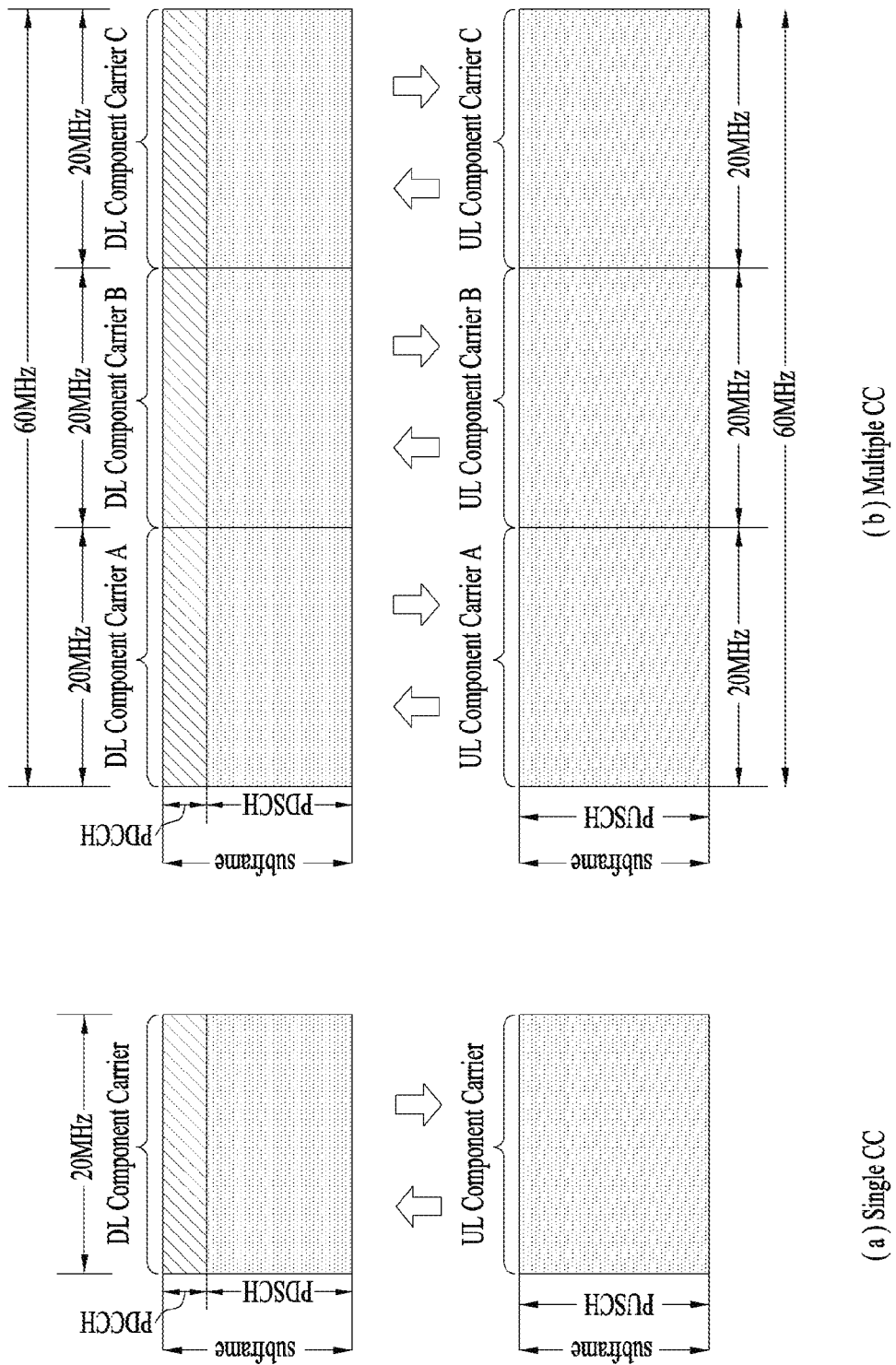
FIG. 6 is a diagram illustrating an example of a component carrier (CC) and carrier aggregation (CA) used in an LTE A system.

FIG. 6 illustrates an example of CCs and CA in the LTE-A system, which are used in embodiments of the present disclosure.

FIG. 6(a) illustrates a single carrier structure in the LTE system. There are a DL CC and a UL CC and one CC may have a frequency range of 20 MHz.

FIG. 6(b) illustrates a CA structure in the LTE-A system. In the illustrated case of FIG. 6(b), three CCs each having 20 MHz are aggregated. While three DL CCs and three UL CCs are configured, the numbers of DL CCs and UL CCs are not limited. In CA, a UE may monitor three CCs simultaneously, receive a DL signal/DL data in the three CCs, and transmit a UL signal/UL data in the three CCs.

If a specific cell manages N DL CCs, the network may allocate M (M≤N) DL CCs to a UE. The UE may monitor only the M DL CCs and receive a DL signal in the M DL CCs. The network may prioritize L (L≤M≤N) DL CCs and allocate a main DL CC to the UE. In this case, the UE should monitor the L DL CCs. The same thing may apply to UL transmission.

The linkage between the carrier frequencies of DL resources (or DL CCs) and the carrier frequencies of UL resources (or UL CCs) may be indicated by a higher-layer message such as an RRC message or by system information. For example, a set of DL resources and UL resources may be configured based on linkage indicated by System Information Block Type 2 (SIB2). Specifically, DL-UL linkage may refer to a mapping relationship between a DL CC carrying a PDCCH with a UL grant and a UL CC using the UL grant, or a mapping relationship between a DL CC (or a UL CC) carrying HARQ data and a UL CC (or a DL CC) carrying an HARQ ACK/NACK signal.

2.2 Cross Carrier Scheduling

Two scheduling schemes, self-scheduling and cross carrier scheduling are defined for a CA system, from the perspective of carriers or serving cells. Cross carrier scheduling may be called cross CC scheduling or cross cell scheduling.

In self-scheduling, a PDCCH (carrying a DL grant) and a PDSCH are transmitted in the same DL CC or a PUSCH is transmitted in a UL CC linked to a DL CC in which a PDCCH (carrying a UL grant) is received.

In cross carrier scheduling, a PDCCH (carrying a DL grant) and a PDSCH are transmitted in different DL CCs or a PUSCH is transmitted in a UL CC other than a UL CC linked to a DL CC in which a PDCCH (carrying a UL grant) is received.

Cross carrier scheduling may be activated or deactivated UE-specifically and indicated to each UE semi-statically by higher-layer signaling (e.g. RRC signaling).

If cross carrier scheduling is activated, a Carrier Indicator Field (CIF) is required in a PDCCH to indicate a DL/UL CC in which a PDSCH/PUSCH indicated by the PDCCH is to be transmitted. For example, the PDCCH may allocate PDSCH resources or PUSCH resources to one of a plurality of CCs by the CIF. That is, when a PDCCH of a DL CC allocates PDSCH or PUSCH resources to one of aggregated DL/UL CCs, a CIF is set in the PDCCH. In this case, the DCI formats of LTE Release-8 may be extended according to the CIF. The CIF may be fixed to three bits and the position of the CIF may be fixed irrespective of a DCI format size. In addition, the LTE Release-8 PDCCH structure (the same coding and resource mapping based on the same CCEs) may be reused.

On the other hand, if a PDCCH transmitted in a DL CC allocates PDSCH resources of the same DL CC or allocates PUSCH resources in a single UL CC linked to the DL CC, a CIF is not set in the PDCCH. In this case, the LTE Release-8 PDCCH structure (the same coding and resource mapping based on the same CCEs) may be used.

If cross carrier scheduling is available, a UE needs to monitor a plurality of PDCCHs for DCI in the control region of a monitoring CC according to the transmission mode and/or bandwidth of each CC. Accordingly, an appropriate SS configuration and PDCCH monitoring are needed for the purpose.

In the CA system, a UE DL CC set is a set of DL CCs scheduled for a UE to receive a PDSCH, and a UE UL CC set is a set of UL CCs scheduled for a UE to transmit a PUSCH. A PDCCH monitoring set is a set of one or more DL CCs in which a PDCCH is monitored. The PDCCH monitoring set may be identical to the UE DL CC set or may be a subset of the UE DL CC set. The PDCCH monitoring set may include at least one of the DL CCs of the UE DL CC set. Or the PDCCH monitoring set may be defined irrespective of the UE DL CC set. DL CCs included in the PDCCH monitoring set may be configured to always enable self-scheduling for UL CCs linked to the DL CCs. The UE DL CC set, the UE UL CC set, and the PDCCH monitoring set may be configured UE-specifically, UE group-specifically, or cell-specifically.

If cross carrier scheduling is deactivated, this implies that the PDCCH monitoring set is always identical to the UE DL CC set. In this case, there is no need for signaling the PDCCH monitoring set. However, if cross carrier scheduling is activated, the PDCCH monitoring set may be defined within the UE DL CC set. That is, the eNB transmits a PDCCH only in the PDCCH monitoring set to schedule a PDSCH or PUSCH for the UE.

Figure 7:
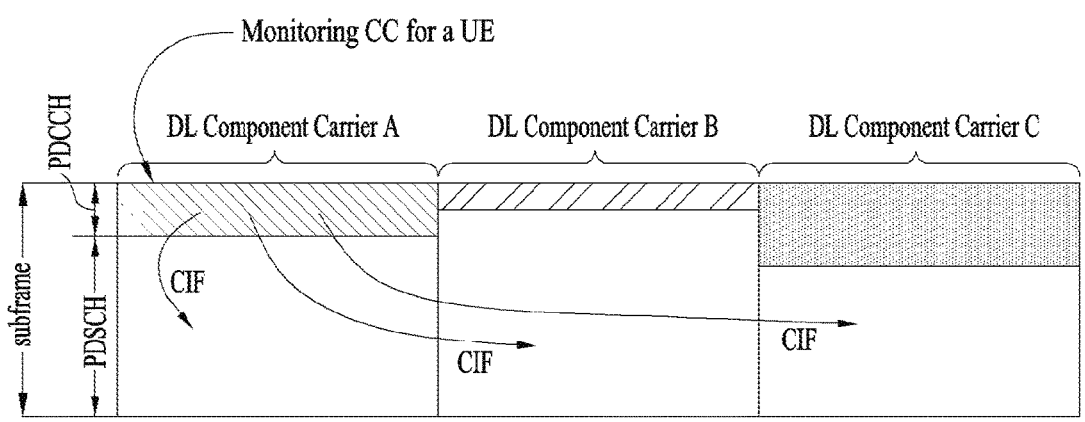
FIG. 7 illustrates a subframe structure of an LTE-A system according to cross-carrier scheduling.

FIG. 7 illustrates a cross carrier-scheduled subframe structure in the LTE-A system, which is used in embodiments of the present disclosure.

Referring to FIG. 7, three DL CCs are aggregated for a DL subframe for LTE-A UEs. DL CC 'A' is configured as a PDCCH monitoring DL CC. If a CIF is not used, each DL CC may deliver a PDCCH that schedules a PDSCH in the same DL CC without a CIF. On the other hand, if the CIF is used by higher-layer signaling, only DL CC 'A' may carry a PDCCH that schedules a PDSCH in the same DL CC 'A' or another CC. Herein, no PDCCH is transmitted in DL CC 'B' and DL CC 'C' that are not configured as PDCCH monitoring DL CCs.

Figure 8:
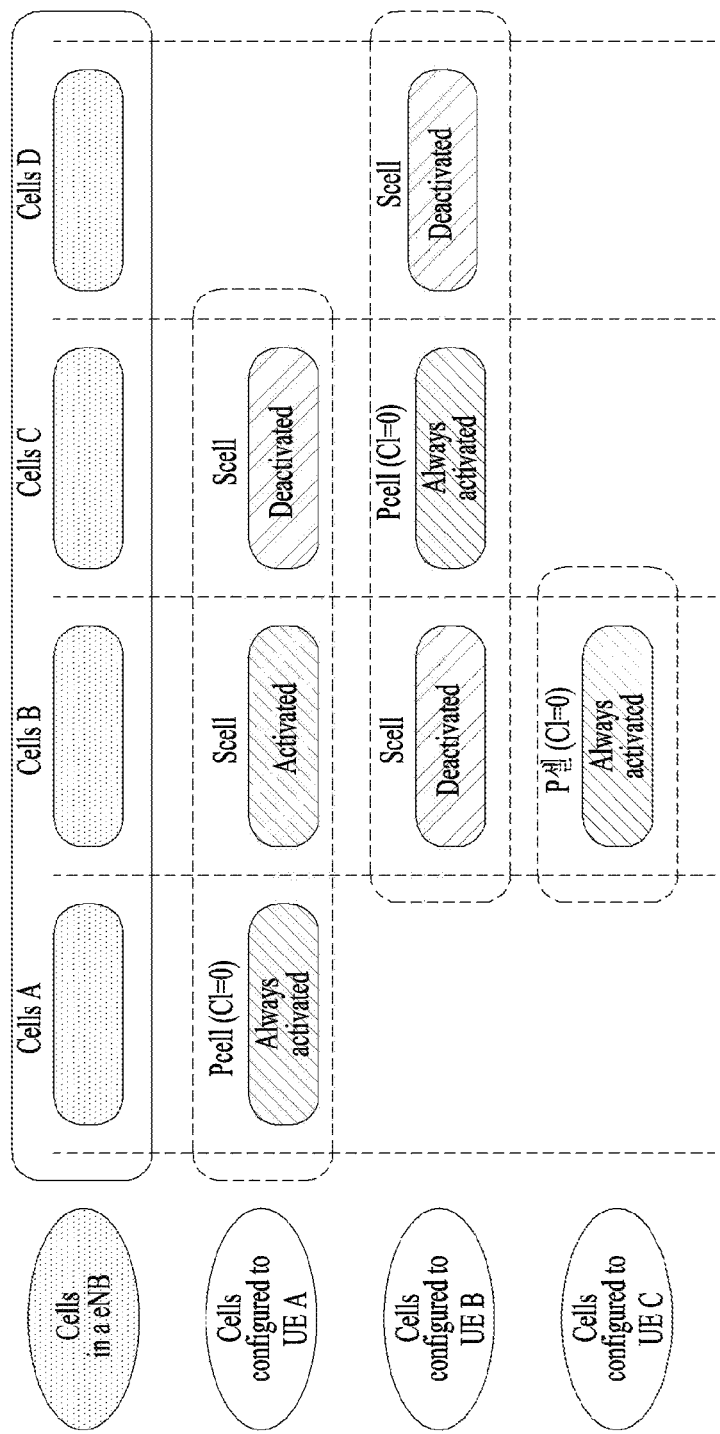
FIG. 8 is a conceptual diagram illustrating a construction of serving cells according to cross-carrier scheduling.

FIG. 8 is conceptual diagram illustrating a construction of serving cells according to cross-carrier scheduling.

Referring to FIG. 8, an eNB (or BS) and/or UEs for use in a radio access system supporting carrier aggregation (CA) may include one or more serving cells. In FIG. 8, the eNB can support a total of four serving cells (cells A, B, C and D). It is assumed that UE A may include Cells (A, B, C), UE B may include Cells (B, C, D), and UE C may include Cell B. In this case, at least one of cells of each UE may be composed of Pcell. In this case, Pcell is always activated, and Scell may be activated or deactivated by the eNB and/or UE.

The cells shown in FIG. 8 may be configured per UE. The above-mentioned cells selected from among cells of the eNB, cell addition may be applied to carrier aggregation (CA) on the basis of a measurement report message received from the UE. The configured cell may reserve resources for ACK/NACK message transmission in association with PDSCH signal transmission. The activated cell is configured to actually transmit a PDSCH signal and/or a PUSCH signal from among the configured cells, and is configured to transmit CSI reporting and Sounding Reference Signal (SRS) transmission. The deactivated cell is configured not to transmit/receive PDSCH/PUSCH signals by an eNB command or a timer operation, and CRS reporting and SRS transmission are interrupted.

2.3 CA Environment Based CoMP Operation

Hereinafter, a cooperation multi-point (CoMP) transmission operation applicable to the embodiments of the present invention will be described.

In the LTE-A system, CoMP transmission may be implemented using a carrier aggregation (CA) function in the LTE. FIG. 9 is a conceptual view illustrating a CoMP system operated based on a CA environment.

In FIG. 9, it is assumed that a carrier operated as a Pcell and a carrier operated as an Scell may use the same frequency band on a frequency axis and are allocated to two eNBs geographically spaced apart from each other. At this time, a serving eNB of UE1 may be allocated to the Pcell, and a neighboring cell causing much interference may be allocated to the Scell. That is, the eNB of the Pcell and the eNB of the Scell may perform various DL/UL CoMP operations such as joint transmission (JT), CS/CB and dynamic cell selection for one UE.

FIG. 9 illustrates an example that cells managed by two eNBs are aggregated as Pcell and Scell with respect to one UE (e.g., UE1). However, as another example, three or more cells may be aggregated. For example, some cells of three or more cells may be configured to perform CoMP operation for one UE in the same frequency band, and the other cells may be configured to perform simple CA operation in different frequency bands. At this time, the Pcell does not always need to participate in CoMP operation.

2.4 Reference Signal (RS)

In the following, reference signals capable of being used in the embodiments of the present invention are explained.

Figure 10:
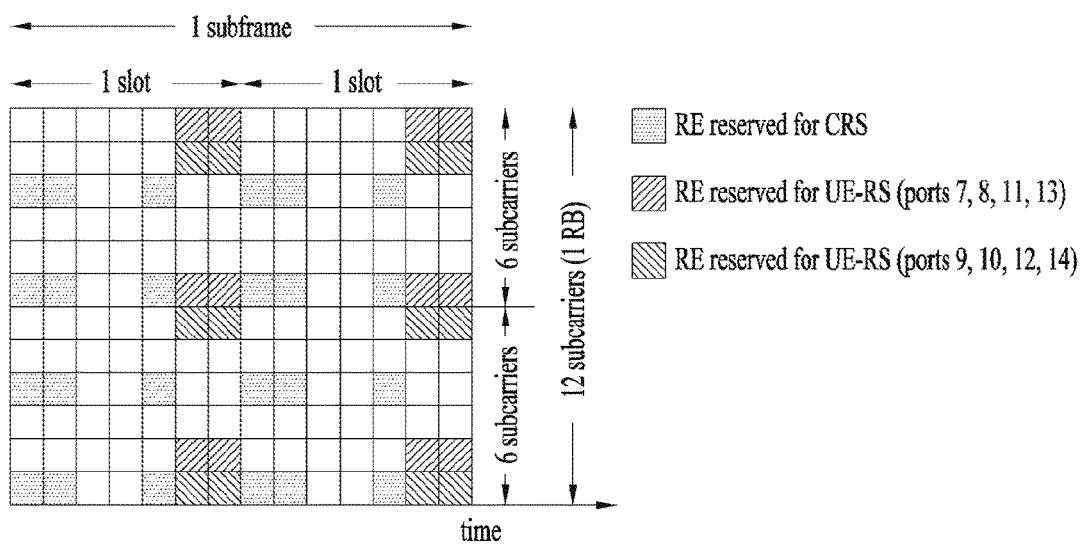
FIG. 10 illustrates an example of a subframe to which UE-specific Reference Signals (UE-RSs) are allocated.

FIG. 10 illustrates an example of a subframe to which UE-RSs are allocated, which may be used in embodiments of the present disclosure.

Referring to FIG. 10, the subframe illustrates REs occupied by UE-RSs among REs in one RB of a normal DL subframe having a normal CP.

UE-RSs are transmitted on antenna port(s) p=5, p=7, p=8 or p=7, 8, . . . , υ+6 for PDSCH transmission, where υ is the number of layers used for the PDSCH transmission. UE-RSs are present and are a valid reference for PDSCH demodulation only if the PDSCH transmission is associated with the corresponding antenna port. UE-RSs are transmitted only on RBs to which the corresponding PDSCH is mapped.

The UE-RSs are configured to be transmitted only on RB(s) to which a PDSCH is mapped in a subframe in which the PDSCH is scheduled unlike CRSs configured to be transmitted in every subframe irrespective of whether the PDSCH is present. Accordingly, overhead of the RS may decrease relative to overhead of the CRS.

In the 3GPP LTE-A system, the UE-RSs are defined in a PRB pair. Referring to FIG. 9, in a PRB having frequency-domain index nPRB assigned for PDSCH transmission with respect to p=7, p=8, or p=7, 8, . . . , υ+6, a part of UE-RS sequence r(m) is mapped to complex-valued modulation symbols $a_{k,l}^{(p)}$ in a subframe according to the following equation 10.

UE-RSs are transmitted through antenna port(s) corresponding respectively to layer(s) of a PDSCH. That is, the number of UE-RS ports is proportional to a transmission rank of the PDSCH. Meanwhile, if the number of layers is 1 or 2, 12 REs per RB pair are used for UE-RS transmission and, if the number of layers is greater than 2, 24 REs per RB pair are used for UE-RS transmission. In addition, locations of REs occupied by UE-RSs (i.e. locations of UE-RS REs) in a RB pair are the same with respect to a UE-RS port regardless of a UE or a cell.

As a result, the number of DM-RS REs in an RB to which a PDSCH for a specific UE in a specific subframe is mapped is the same per UE-RS ports. Notably, in RBs to which the PDSCH for different UEs in the same subframe is allocated, the number of DM-RS REs included in the RBs may differ according to the number of transmitted layers.

The UE-RS can be used as the DM-RS in the embodiments of the present invention.

2.5 Enhanced PDCCH (EPDCCH)

In the 3GPP LTE/LTE-A system, cross carrier scheduling (CCS) in an aggregation status for a plurality of component carriers (CC: component carrier=(serving) cell) will be defined. One scheduled CC may previously be configured to be DL/UL scheduled from another one scheduling CC (that is, to receive DL/UL grant PDCCH for a corresponding scheduled CC). At this time, the scheduling CC may basically perform DL/UL scheduling for itself. In other words, a search space (SS) for a PDCCH for scheduling scheduling/scheduled CCs which are in the CCS relation may exist in a control channel region of all the scheduling CCs.

Meanwhile, in the LTE system, FDD DL carrier or TDD DL subframes are configured to use first n (n<=4) OFDM symbols of each subframe for transmission of physical channels for transmission of various kinds of control information, wherein examples of the physical channels include a PDCCH, a PHICH, and a PCFICH. At this time, the number of OFDM symbols used for control channel transmission at each subframe may be delivered to the UE dynamically through a physical channel such as PCFICH or semi-statically through RRC signaling.

Figure 11:
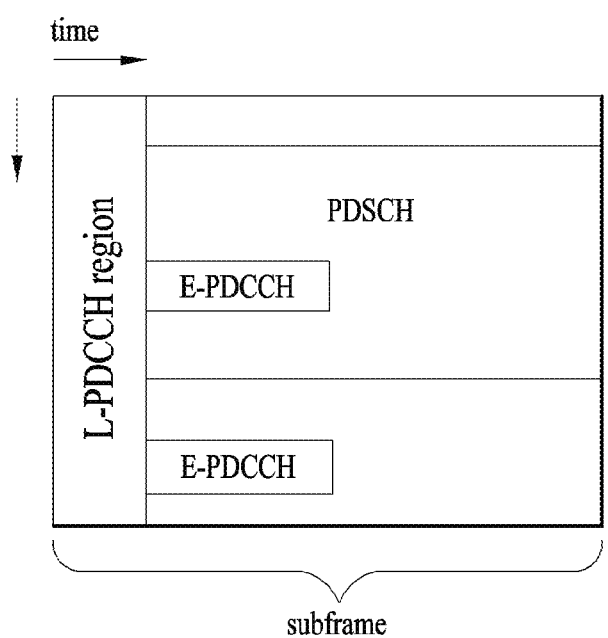
FIG. 11 illustrates an example that legacy PDCCH, PDSCH and E-PDCCH, which are used in an LTE/LTE-A system, are multiplexed.

Meanwhile, in the LTE/LTE-A system, since a PDCCH which is a physical channel for DL/UL scheduling and transmitting various kinds of control information has a limitation that it is transmitted through limited OFDM symbols, enhanced PDCCH (i.e., E-PDCCH) multiplexed with a PDSCH more freely in a way of FDM/TDM may be introduced instead of a control channel such as PDCCH, which is transmitted through OFDM symbol and separated from PDSCH. FIG. 11 illustrates an example that legacy PDCCH, PDSCH and E-PDCCH, which are used in an LTE/LTE-A system, are multiplexed.

Figure 12:
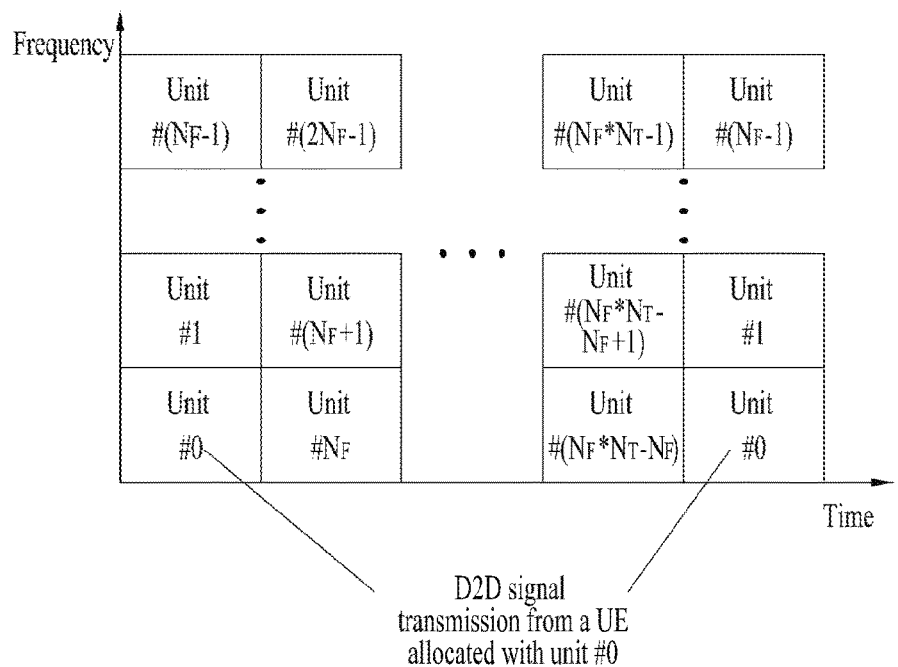
FIG. 12 is a diagram for explaining a resource configuration used in D2D communication.

3. Device to Device (D2D) Communication 3.1 Resource Configuration for D2D Communication In the following, a resource configuration used in D2D communication is explained. FIG. 12 is a diagram for explaining a resource configuration used in D2D communication.

In general, a resource pool includes a plurality of resource units. A UE selects one or more resource units from among a plurality of the resource units and may be able to use the selected resource unit(s) for D2D communication. FIG. 12 shows a method of configuring a resource unit. Referring to FIG. 12, the entire frequency resource pool is divided into the $N_F$ number of resource units and the entire time resource pool is divided into the $N_T$ number of resource units. In particular, it is able to define $N_F*N_T$ number of resource units in total.

In this case, a resource pool can be repeated with a period of $N_T$ subframes. And, one resource unit can be periodically and repeatedly allocated in a resource pool. For instance, it is able to see that resource units #0, #1, ..., and #($N_F$−1) are repeatedly allocated in a resource pool with a period of prescribed time. In particular, if a resource unit #0 is allocated to a UE, the UE is able to use all resource units indexed by the resource unit #0 in a resource pool.

And, the resource units in the resource pool or the resource pool itself can be configured to change an index of a physical resource unit to which a logical resource unit is mapped with a predetermined pattern according to time to obtain a diversity gain in time domain and/or frequency domain. In this resource unit structure, a resource pool may correspond to a set of resource units capable of being used for a UE intending to transmit and receive a D2D signal to transmit and receive the D2D signal.

In the embodiments of the present invention, a resource pool for D2D communication can be classified into various types. First of all, the resource pool can be classified according to content or a type of a D2D signal transmitted via each resource pool. For example, a D2D signal can be classified into an SA (scheduling assignment) signal, a D2D data channel signal, a discovery channel signal, and the like.

The SA signal may correspond to a signal including information on a resource position to which a D2D data channel for D2D communication is assigned, information on MCS (modulation and coding scheme) necessary for modulating and demodulating a D2D data channel, information on a MIMO transmission scheme, and/or information on a TA (timing advance), and the like. The SA signal can be independently transmitted on a prescribed resource unit or the SA signal and D2D data can be transmitted on an identical resource unit in a manner of being multiplexed. When the SA signal and the data are multiplexed, an SA resource pool may correspond to a set of resource units that an SA and D2D data are transmitted in a manner of being multiplexed. In the embodiments of the present invention, a resource unit on which an SA signal is transmitted can be referred to as an SA channel or a D2D control channel.

A D2D data channel can be defined as a set of resource units for transmitting and receiving a D2D data using a resource designated by UEs via SA. The D2D data channel can be multiplexed with an SA channel. And, in case of the D2D data channel, a D2D data signal can be multiplexed only without an SA signal.

In this case, when an SA signal and a D2D data channel are transmitted in a manner of being multiplexed on an identical resource unit, it may be able to configure the D2D data channel to be transmitted only to a resource pool for the D2D data channel except the SA signal. In other word, a resource unit used for transmitting SA information on an individual resource unit in an SA resource pool can also be used for transmitting D2D data in the resource pool for the D2D data channel.

The discovery channel may correspond to a set of resource units for transmitting a signal or a message that enables a neighboring UE to discover a UE configured to perform D2D communication. The UE configured to perform D2D communication transmits information such as an identifier of the UE, and the like to the neighboring UE to make the neighboring UE discover the UE.

In this case, an SA channel for transmitting an SA signal, a data channel for transmitting and receiving D2D data, and a discovery channel for transmitting and receiving a discovery signal can be configured in a single resource pool. Or, each of the SA channel, the D2D data channel, and the discovery channel can be configured by a separate resource pool.

Or, although contents of D2D signal are identical to each other, a different resource pool can be allocated according to a transmission/reception attribute of the D2D signal.

For example, although a D2D data channel and a discovery channel have a same type, the D2D data channel or the discovery channel can be configured by a different resource pool according to (1) a transmission timing determination scheme of a D2D signal (e.g., whether a D2D signal is transmitted at a timing at which a synchronization reference signal is received or a timing of which a prescribed TA is applied to the reception timing), (2) a resource allocation scheme (e.g., a resource for transmitting an individual signal is designated to an individual transmission UE by an eNB or the individual transmission UE autonomously selects a resource for transmitting an individual signal from a resource pool), (3) a signal format (e.g., the number of symbols occupied by a D2D signal in a subframe, the number of subframes for transmitting a D2D signal, etc.), (4) strength of a signal received from an eNB, and/or (5) transmit power strength of a D2D UE.

In the embodiments of the present invention, for clarity, a method for an eNB to directly schedule a resource region of a D2D transmission UE in D2D communication is defined as a mode 1. And, when a D2D transmission resource region is configured in advance or an eNB allocates the transmission resource region, a method for a UE to select a resource unit for D2D communication from the transmission resource region is defined as a mode 2.

In case of D2D discovery, a case of selecting a resource unit for D2D discovery directly selected by a UE from a predetermined resource region or a resource region indicated by an eNB is defined as a type 1. And, a case of scheduling a resource region for a discovery channel directly scheduled by an eNB is defined as a type 2.

In the embodiments of the present invention, channels for D2D communication can also be referred to as a sidelink. In this case, an SA channel is referred to as a physical sidelink control channel (PSCCH), a D2D synchronization signal is referred to as a sidelink synchronization signal (SLSS), and a control channel for broadcasting most basic system information for D2D communication can be referred to as a physical sidelink broadcast channel (PSBCH), respectively. The SLSS can also be named as a PD2DSCH (physical D2D synchronization channel). And, a channel for transmitting a D2D discovery signal can be defined as a physical sidelink discovery channel (PSDCH).

In LTE-A system (Rel-12, 13 or higher), a D2D communication UE is configured to transmit the PSBCH and the SLSS together or is configured to transmit the SLSS. And, the LTE-A system newly defines an S-RSRP (sidelink RSRP) to match synchronization with a different UE in D2D communication. In particular, when UEs intend to perform D2D communication, it may measure the S-RSRP and check UEs of which the S-RSRP is equal to or greater than a specific value. By doing so, it may be able to match synchronization of the UEs only and perform D2D communication. In this case, the S-RSRP can be measured from a DM-RS on the PSBCH. Yet, for a D2D relay operation, the S-RSRP can also be measured from a DM-RS on the PSDCH.

And, an out-coverage UE measures the S-RSRP based on DM-RS signal strength of the SLSS and/or the PSBCH/PSCCH/PSSCH to determine whether or not the S-RSRP becomes a synchronization source for performing a D2D relay operation of the out-coverage UE.

3.2 D2D Communication Scheme

In the embodiments of the present invention, device to device communication can be used in a manner of being mixed with such a term as D2D communication, direct communication between devices, and the like and has a same meaning. And, a UE corresponds to a terminal of a user in general. Yet, if such a network device as an eNB transceives a signal with a UE according to a communication scheme between the eNB and the UE, the eNB can also be regarded as a kind of UEs.

Figure 13:
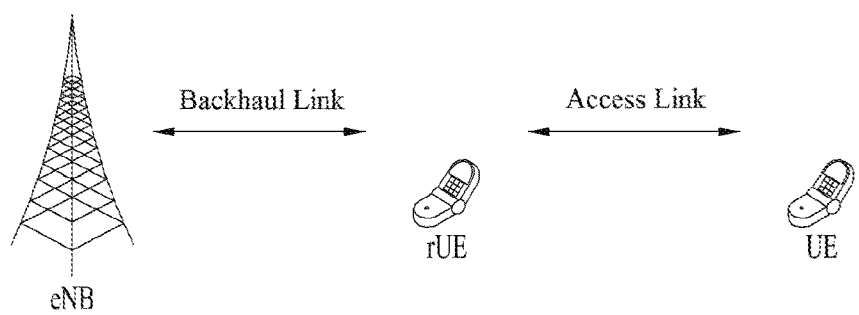
FIG. 13 is a diagram for explaining a relation among a base station, a relay UE, and a general UE as an example of D2D relay communication.

FIG. 13 is a diagram for explaining a relation among a base station, a relay UE, and a general UE as an example of D2D relay communication.

A relay-UE (rUE) corresponds to a UE operating as a relay to provide network connectivity to an out-of-coverage UE or a UE incapable of performing direct communication with an eNB. The rUE maintains not only a link with the eNB but also a link with a general UE and forwards information received from the eNB to the general UE or forwards information received from the general UE to the eNB. In this case, a link between the eNB and the rUE is defined as a backhaul link and a link between the rUE and the UE is defined as an access link, respectively. And, a link for performing direct communication between UEs without the involvement of the eNB can be defined as a D2D link.

Referring to FIG. 13, the rUE selects a resource unit corresponding to a specific resource from a resource pool corresponding to a set of resources for D2D communication (refer to FIG. 12) and may be able to transmit a D2D signal using the selected resource unit. In this case, the D2D signal may correspond to a data signal transmitted and received for direct communication between UEs and a data signal transceived between a general UE and an eNB via the rUE to perform relay communication.

The UE is able to receives a configuration of a resource pool from a base station as a general terminal and/or an rUE and maybe able to detect a D2D signal of the rUE in the resource pool. In this case, if the rUE is located within a connection range of the base station, the base station can inform the rUE and/or the UE of information on the resource pool. Or, if the rUE is located at the outside of the connection range of the base station, a different UE may inform the rUE or the UE of the information on the resource pool or the resource pool can be configured by predetermined resources in advance.

In case of D2D communication, there may exist one or more D2D relay UEs. In particular, as mentioned in the foregoing description, when S-RSRP and the like are measured based on a DM-RS of DM-RS signal strength of SLSS and/or PSBCH/PSCCH/PSSCH, if UEs has S-RSRP equal to or greater than a prescribed level, the UEs may operate as relay UEs (rUEs).

4. D2D Relay Transmission Method

The embodiment of the present invention provides methods of determining data to be actually relayed by an rUE among a plurality of D2D data received by the rUE when UL transmission is performed by utilizing the rUE.

The embodiments of the present invention described in the following can operate based on the contents mentioned earlier in the paragraphs 1 to 3. In particular, unless there is additional explanation, the contents of the paragraphs 1 to 3 can be applied to the embodiments of the present invention.

A UE can be classified into an in-network UE (In-NW UE) and an out-of-coverage UE depending on whether or not the UE is able to perform smooth communication with an eNB.

Assume that the in-NW-UE corresponds to UEs capable of smoothly performing UL and/or DL communication with a specific eNB. For example, the in-NW UE can be defined as UEs having reception signal strength, which is received from the specific eNB, is equal to or greater than X dBm.

The out-of-coverage UE may receive only basic control information (e.g., control information broadcasted by system information) that very high reliability is guaranteed by an eNB. The out-of-coverage UE corresponds to UEs incapable of reliably transmitting and receiving a UE-specific signal. For example, the out-of-coverage UE can be defined as a UE having reception signal strength, which is received from the specific eNB, is less than X dBm.

Figure 14:
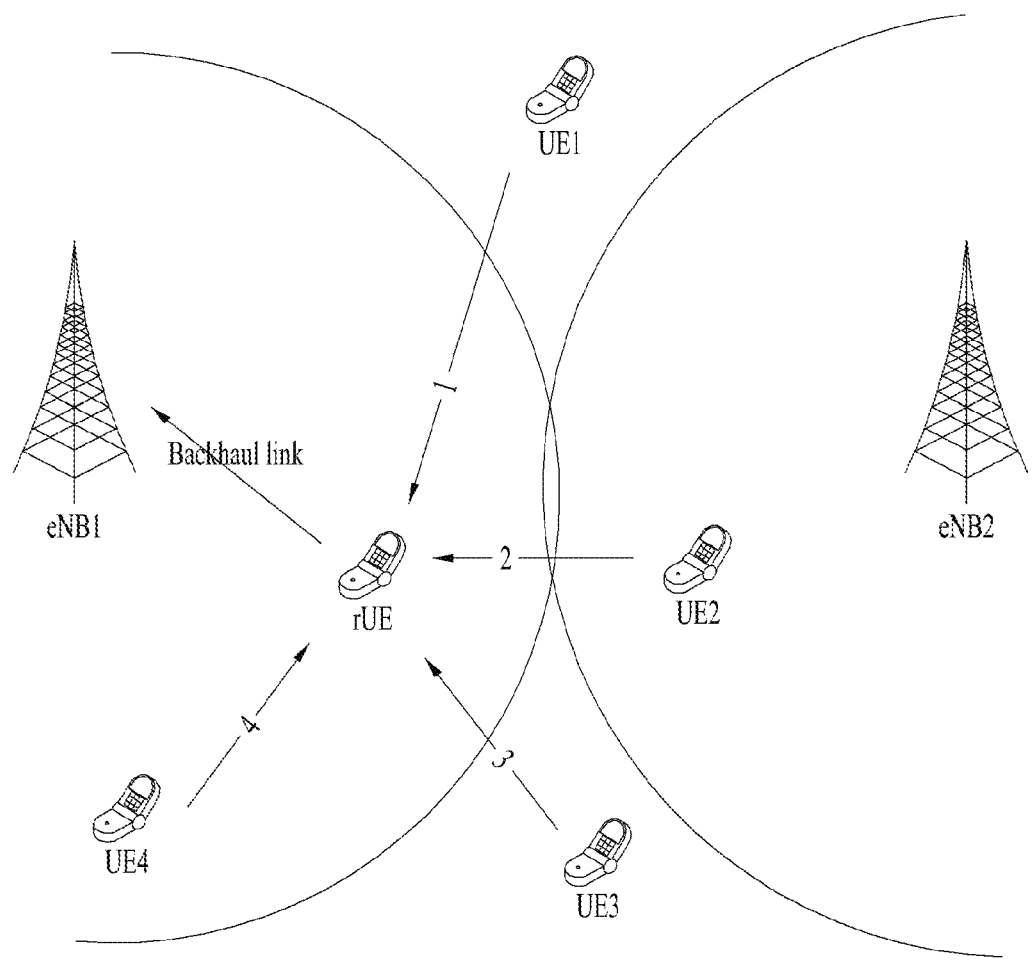
FIG. 14 is a diagram for explaining an example of D2D relay communication.

FIG. 14 is a diagram for explaining an example of D2D relay communication.

In FIG. 14, a UE1 and a UE3 correspond to out-of-coverage UEs, a UE2 and a UE4 correspond to In-NW UEs, and an rUE corresponds to a relay UE configured to perform a relay operation. In the embodiments of the present invention, assume that a rUE corresponds to a UE configured as the rUE by the indication of an eNB (eNB1) or coordination between rUEs, the rUE broadcasts a discovery signal and the like, and neighboring UEs are aware of the existence of the rUE.

The rUE can receive D2D data from the IN-NW UE (i.e., UE4) of a serving cell, the IN-NW UE (i.e., UE2) of a neighboring cell, and the out-of-coverage UEs (i.e., UE1, UE3) to perform UL transmission.

Since the IN-NW UEs have at least a link with an eNB, it is not necessary for the rUE to relay the D2D data received from the IN-NW UEs via a backhaul link between the eNB1 and the rUE. In particular, it is preferable for the rUE to relay a part of the received D2D data only via the backhaul link. For example, in case of performing UL transmission, the rUE can perform relaying on D2D data of the out-of-coverage UE only. In particular, the present invention proposes methods for the rUE to identify D2D data transmitted by the out-of-coverage UE only among D2D data transmitted by D2D UEs.

In the embodiments of the present invention, the D2D data transmitted by the out-of-coverage UE can be referred to as first D2D data and D2D data transmitted by the In-NW UE can be referred to as second D2D data.

4.1 Method of Relaying Resource Pool-Based D2D Data

A set of a series of resources for D2D communication can be defined as a resource pool. For details, it may refer to FIG. 12 and explanation on FIG. 12. In this case, an eNB can inform In-NW UEs of a time-frequency resource position of the resource pool, a usage of the resource pool (e.g., discovery message, D2D data, and the like) and/or a use entity (e.g., In-NW UE or out-of-coverage UE) of the resource pool, and the like via a control signal.

For example, assume a case that an eNB transmits a control signal for allocating one resource pool to an In-NW UE and allocating another resource pool to an out-of-coverage UE. Having received the control signal, a rUE can forward the received control signal to the out-of-coverage UE (e.g., the control signal is forwarded via PSBCH (physical sidelink broadcast channel)).

Having received the control signal, the rUE can forward information on a resource pool to be used by the out-of-coverage UE only among control signals for the resource pool to the out-of-coverage UE. Hence, the rUE considers that UL data transmitted via a resource pool allocated to the out-of-coverage UE is transmitted by the out-of-coverage UE and may be able to relay the UL data to an eNB or a different UE.

As a different aspect of the present embodiment, when an eNB transmits a plurality of transmission resource pools, the eNB can additionally transmit a resource pool indicator indicating whether or not an individual resource pool corresponds to a resource pool allocated to an out-of-coverage UE. In particular, the eNB can transmit a resource pool indicator indicating whether or not a resource pool corresponds to a resource pool allocated to an out-of-coverage UE in a manner of including the resource pool indicator in a control signal for allocating a resource pool.

Therefore, the rUE can relay a D2D data received via a resource pool allocated to an out-of-coverage UE only.

4.2 Method of Performing D2D Relay Using D2D Synchronization Signal

When D2D communication is performed, it is necessary to match time and frequency synchronization between a transmitting end and a receiving end. In general, an In-NW-UE matches synchronization with an eNB capable of providing more stable synchronization compared to a different D2D transmission UE.

On the contrary, since it is difficult for an out-of-coverage UE to perform smooth communication with an eNB, it is also difficult for the out-of-coverage UE to match synchronization with the eNB. Hence, in order to match time and frequency synchronization between the out-of-coverage UE and a rUE, at least a part of transmission UEs may transmit a synchronization signal which becomes a reference for the time/frequency synchronization. In this case, the synchronization signal can be defined as a D2D synchronization signal (D2DSS).

Figure 15:
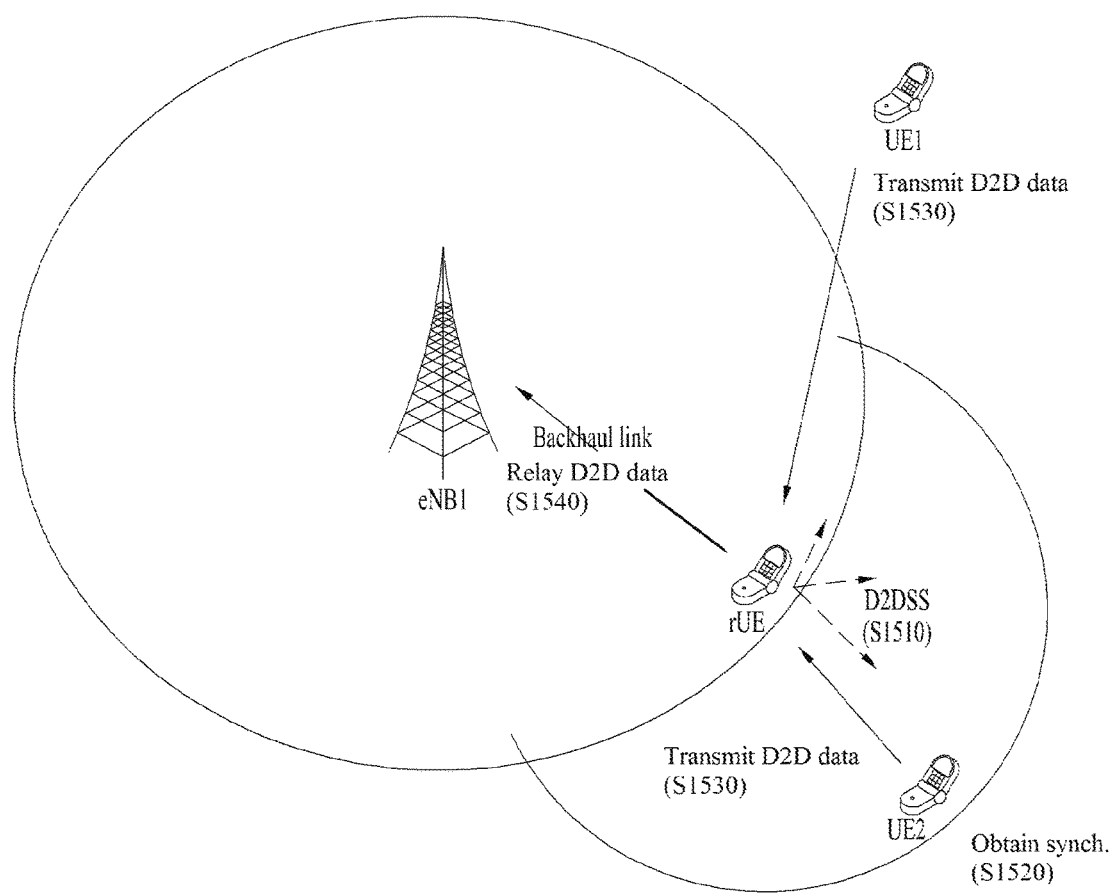
FIG. 15 is a flowchart for explaining one of D2D relay methods using a D2D synchronization signal.

FIG. 15 is a flowchart for explaining one of D2D relay methods using a D2D synchronization signal.

In FIG. 15, assume that a rUE corresponds to a UE configured as a relay UE in advance and a UE1 and a UE2 correspond to out-of-coverage UEs. In this case, the UE2 corresponds to a UE belonging to one hop D2D coverage of the rUE. As shown in FIG. 15, the rUE can be configured to relay D2D data of the UE2 only existing within one hop coverage radius of the rUE among out-of-coverage UEs near the rUE.

If the rUE broadcasts a D2DSS to match synchronization between D2D UEs, out-of-coverage UEs receives the D2DSS and may be then able to transmit D2D data by matching synchronization with the received D2DSS. In this case, it is able to assume that the out-coverage UE, which have matched synchronization with the D2DSS broadcasted by the rUE, is located within one hop D2D coverage of the rUE.

Therefore, the rUE receives the D2D data only, which is transmitted in a manner of being matched with the D2DSS transmitted by the rUE, and may be able to relay UL data via a backhaul link. In this case, as an example of a method for the out-of-coverage UE to transmit D2D data by matching synchronization with the D2DSS of the rUE, the out-of-coverage UE can notify that a source of the D2DSS corresponds to the rUE via PSBCH.

Referring back to FIG. 15, the rUE transmits the D2DSS to the out-of-coverage UE [S1510].

In FIG. 15, assume that the UE1 is located at the outside of one-hop D2D coverage and the UE1 is unable to receive the D2DSS. The UE2 is located within the one-hop D2D coverage and the UE2 is able to receive the D2DSS. Hence, the UE2 can match synchronization with the rUE through the D2DSS [S1520].

Subsequently, if the UE1 and the UE2 transmit D2D signals to the rUE, the rUE can receive D2D data from both the UE1 and the UE2 [S1530].

In this case, the rUE can transmit the D2D data of the UE2 synchronized with the rUE only to the eNB via a backhaul link [S1540].

4.3 Method of Performing D2D Relay Using SA and/or Data Header

In order to transmit D2D data via D2D communication, it is necessary to preferentially transmit resource allocation information (e.g., a location of an allocated resource region (or, resource pool)) to which the D2D data is transmitted, MCS (modulation and coding scheme), and the like).

In this case, transmitting a D2D signal including the resource allocation information can be defined as SA (scheduling assignment). The SA is transmitted to a receiving end from a transmitting end intending to transmit D2D data. And, the SA can be periodically or aperiodically transmitted from the transmitting end.

According to embodiment of the present invention, a relay bit (or, a relay indicator) indicating that a corresponding entity corresponds to an out-of-coverage UE is added to SA or a packet header of D2D data. By doing so, it is able to explicitly notify that D2D data transmitted via a region allocated by the SA or D2D data including the packet header corresponds to an out-of-coverage UE.

Hence, the rUE checks the SA or the packet data of the D2D data to determine the D2D data transmitted from the out-of-coverage UE and may be then able to relay the D2D data.

4.4 Method of Performing D2D Relay Using Discovery Signal

When D2D UEs intend to inform a neighboring UE of the existence of the D2D UEs or perform D2D communication, the D2D UEs can transmit a discovery message to the neighboring UE. In particular, since the discovery message is transmitted to inform the neighboring UE of the existence of the D2D UEs, the discovery message includes information on an identifier (ID) of a D2D transmission UE, and the like.

When the discovery message includes not only the ID of the transmissions UE but also information for indicating whether or not a UE corresponds to an out-of-coverage UE, a field or signaling, and the like (e.g., a specific value of PLMN ID included in a discovery message for public safety is preconfigured by a value indicating an out-of-coverage UE), if a rUE receives the discovery message, the rUE can configure and store a list of out-of-coverage UEs.

Hence, if source identifier information included in the SA or the packet header of the D2D data is included in source identifier information included in the list of the out-of-coverage UEs stored by the rUE, the rUE can relay the D2D data.

4.5 Method of Performing D2D Relay Using DM-RS

In the following, a method for a rUE to select D2D data to be relayed using a DM-RS is explained.

In a legacy LTE/LTE-A system, a DM-RS is configured to be identically used by every UE. Yet, the DM-RS can be distinguished from each other through a base sequence, CS (cyclic shift), and/or an OCC (orthogonal cover code). In the embodiment of the present invention, in order to distinguish D2D data transmitted by In-NW UE from D2D data transmitted from out-of-coverage UE, it may be able to use an attribute of a DM-RS sequence.

A base sequence is explained in the following as an example. A predetermined offset value can be set to the base sequence. If a UE ID is restricted by 8 bits, the offset value can be set to 512. In this case, an In-NW UE can be configured to generate a base sequence based on the UE ID of the legacy 8 bits and an out-of-coverage UE can be configured to generate a base sequence based on {offset+UE ID}. Hence, if a base sequence constructing a received DM-RS includes a UE ID and an offset value, a rUE is able to check that D2D data transmitted based on the DM-RS is transmitted by the out-of-coverage UE and may be able to relay the D2D data.

In case of utilizing CS, it may be able to separately configure a CS value capable of being used by the In-NW UE and a CS value capable of being used by the out-of-coverage UE in advance.

In case of utilizing an OCC, similarly, it may be able to separately configure a value capable of being used by the In-NW UE and a value capable of being used by the out-of-coverage UE in advance. For example, it may be able to configure the In-NW UE to use [1 1] and configure the out-of-coverage UE to use [1 −1]. By doing so, the rUE is able to determine whether or not D2D data is a relay target via an OCC of a DM-RS.

Hence, the rUE performs decoding on the DM-RS for the received D2D data. If it is determined that the D2D data corresponds to D2D data transmitted by the out-of-coverage UE, the rUE can relay the D2D data.

4.6 Method of Performing D2D Relay Using UE Identifier

Out-of-coverage UEs can notify whether or not relaying is required using UE identifier information loaded on SA and/or D2D data. In particular, the rUE can determine whether or not D2D data is relayed based on a UE ID included in the SA and/or the D2D data.

4.6.1 Method 1

As a first method, address information of a rUE is included in an SA ID field which is included in SA and an ID of a destination eNB (or a destination UE or a destination UE group), which becomes a final reception target of D2D data, can be included in a destination ID field which is included in a MAC header of the D2D data.

In this case, the ID of the destination eNB may correspond to a cell identifier (cell ID) or a predetermined specific ID. For example, if D2D data includes a specific ID, it may indicate that relaying is performed via a network.

Hence, the rUE receives SA including address information of the rUE only among many SAs existing in a resource pool designated as SA usage, performs decoding on D2D data transmitted via a resource allocated by the SA, and can relay the D2D data to a destination indicated by the destination ID.

SA can be transmitted in a physical layer. In particular, an SA ID field included in the SA includes an identifier or address information used in the physical layer. A destination ID field included in a MAC header of D2D data uses an identifier used in a MAC layer. Hence, the rUE can determine whether or not SA corresponds to SA to be decoded by the rUE by checking the SA ID of the SA detected in the physical layer. And, when the rUE receives D2D data which is transmitted via a resource region allocated based on the SA, the rUE can relay the D2D data to a destination indicated by an identifier included in a MAC header of the D2D data. If the MAC header of the D2D data includes a specific ID indicating a relay target of the D2D data, the rUE can relay the D2D data to the eNB in case of UL transmission.

In the embodiments of the present invention, the SA ID field can also be referred to as a group destination ID field. In particular, the group destination DI field is included in PSCCH (or, SA) and indicates a destination to which PSCCH is transmitted.

4.6.2 Method 2

As a second method, a predefined address value can be included in the SA ID field. In this case, the predefined address value can indicate that D2D data transmitted via a resource region allocated by SA corresponds to a relay target. In particular, the predefined address value can be set to the SA ID field to indicate data to be relayed.

The rUE can receive not only SA including address information of the rUE but also SA including address information predefined for a relay usage among many SAs existing in a resource pool designated as SA usage. In this case, the rUE can perform relaying on D2D data transmitted via a resource region which is defined by SAs in which address information for relay usage is included only.

4.6.3 Method 3

As a different aspect of the present embodiment, regarding the aforementioned method 1 and the method 2, a specific control signal can be further included in the D2D data. As an example of the specific control signal, it may use a path configuration request message to configure a path among eNB-rUE-UE.

If a destination identifier included in a MAC header of D2D data corresponds to an address of the rUE and a specific control signal is included in the D2D data, the rUE can transmit MAC PDU directly generated by the rUE to an eNB and/or a UE to configure a path for performing relaying among eNB-rUE-UE.

In particular, the rUE can transmit the MAC PDU directly generated by the rUE to the eNB and/or the UE to indicate that the received D2D data is transmitted from an out-of-coverage UE.

Or, if the destination identifier included in the MAC header information of the D2D data indicates an eNB, the rUE can relay the D2D data to a serving eNB.

As a further different aspect of the present embodiment, regarding the aforementioned method 1 and the method 2, D2D data may correspond to a general MAC PDU rather than a control signal. In this case, if a destination identifier included in MAC header information of the D2D data indicates a serving eNB, the rUE can relay the D2D data to the serving eNB.

Or, if the destination identifier included in the MAC header information of the D2D data corresponds to an identifier of a UE (or, a UE group) existing in the vicinity of the rUE, address information can be transmitted in a manner of being included in SA and/or D2D data.

4.7 Method of Preventing Infinite Loop of D2D Relay

If relay between D2D UEs is introduced and multi-hop relay operation is available, an out-of-coverage UE can relay D2D data forwarded by the rUE to a different UE when the methods mentioned earlier in the paragraphs 4.1 to 4.6 are applied.

In order to prevent an infinite loop operation of D2D data, although the D2D data is determined as D2D data transmitted by an out-of-coverage UE via the methods proposed in the paragraphs 4.1 to 4.6, a D2D UE can be configured not to relay the D2D data forwarded from the rUE.

In particular, D2D data transmitted by a general D2D UE becomes a relay target, whereas D2D data forwarded by the rUE can be configured not to be a relay target although a source entity of the D2D data corresponds to an out-of-coverage UE.

The aforementioned embodiments of the present invention can be implemented in a form of a combination. For example, if the methods proposed in the paragraphs 4.1 and 4.2 are combined, the rUE receives D2D data, which is transmitted in a manner of being synchronized with D2DSS transmitted by the rUE, only among D2D data received via a resource pool forwarded to an out-of-coverage UE.

5. Apparatus

Apparatuses illustrated in FIG. 16 are means that can implement the methods described before with reference to FIGS. 1 to 15.

A UE may act as a transmission end on a UL and as a reception end on a DL. An eNB may act as a reception end on a UL and as a transmission end on a DL.

That is, each of the UE and the eNB may include a transmitter 1640 or 1650 and a receiver 1660 or 1670, for controlling transmission and reception of information, data, and/or messages, and an antenna 1600 or 1610 for transmitting and receiving information, data, and/or messages.

Each of the UE and the eNB may further include a processor 1620 or 1630 for implementing the afore-described embodiments of the present disclosure and a memory 1680 or 1690 for temporarily or permanently storing operations of the processor 1620 or 1630.

The embodiments of the present invention can be performed using configuration components and functions of the general UE, the relay UE, and the eNB. For example, the rUE can detect D2D data transmitted by an out-of-coverage UE based on a resource pool, an SA message and/or D2D data. Hence, the rUE can relay D2D data received from the out-of-coverage UE only to an eNB or a different UE among D2D data received from an In-NW UE and the D2D data received from the out-of-coverage UE. For details, it may refer to the paragraphs 3 and 4.

The transmitter and the receiver of the UE and the eNB may perform a packet modulation/demodulation function for data transmission, a high-speed packet channel coding function, OFDMA packet scheduling, TDD packet scheduling, and/or channelization. Each of the UE and the eNB of FIG. 16 may further include a low-power Radio Frequency (RF)/Intermediate Frequency (IF) module.

Meanwhile, the UE may be any of a Personal Digital Assistant (PDA), a cellular phone, a Personal Communication Service (PCS) phone, a Global System for Mobile (GSM) phone, a Wideband Code Division Multiple Access (WCDMA) phone, a Mobile Broadband System (MBS) phone, a hand-held PC, a laptop PC, a smart phone, a Multi Mode-Multi Band (MM-MB) terminal, etc.

The smart phone is a terminal taking the advantages of both a mobile phone and a PDA. It incorporates the functions of a PDA, that is, scheduling and data communications such as fax transmission and reception and Internet connection into a mobile phone. The MB-MM terminal refers to a terminal which has a multi-modem chip built therein and which can operate in any of a mobile Internet system and other mobile communication systems (e.g. CDMA 2000, WCDMA, etc.).

Embodiments of the present disclosure may be achieved by various means, for example, hardware, firmware, software, or a combination thereof In a hardware configuration, the methods according to exemplary embodiments of the present disclosure may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the methods according to the embodiments of the present disclosure may be implemented in the form of a module, a procedure, a function, etc. performing the above-described functions or operations. A software code may be stored in the memory 1680 or 1690 and executed by the processor 1620 or 1630. The memory is located at the interior or exterior of the processor and may transmit and receive data to and from the processor via various known means.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein. It is obvious to those skilled in the art that claims that are not explicitly cited in each other in the appended claims may be presented in combination as an embodiment of the present disclosure or included as a new claim by a subsequent amendment after the application is filed.

INDUSTRIAL APPLICABILITY

The present disclosure is applicable to various wireless access systems including a 3GPP system, a 3GPP2 system, and/or an IEEE 802.xx system. Besides these wireless access systems, the embodiments of the present disclosure are applicable to all technical fields in which the wireless access systems find their applications.

What is claimed is:

1. A method of processing device to device (D2D) data by a relay user equipment (UE) in a wireless access system supporting D2D communication, the method performed by the relay UE and comprising:

receiving, from a D2D UE, a scheduling allocation (SA) signal to allocate a resource region in which the D2D data is received;

receiving, from the D2D UE, the D2D data via the resource region;

when the SA signal or a medium access control (MAC) header related to the D2D data includes a relay indicator, determining that the D2D data is received from an out-of-coverage UE, and relaying the D2D data; and when the SA signal and the MAC header do not include the relay indicator, determining that the D2D data is received from an in-coverage UE, and skipping relaying of the D2D data, wherein the relay indicator indicates that the D2D data is received from the out-of-coverage UE.

2. The method of claim 1, wherein the resource region corresponds to a resource pool allocated to the out-of-coverage or to the in-coverage UE.

3. The method of claim 1, wherein when determining that the D2D data is transmitted from the out-of-coverage UE, the D2D UE is synchronized with the relay UE in time and frequency.

4. The method of claim 1, wherein the relay UE detects the D2D data based on a demodulation reference signal (DM-RS) defined for transmitting D2D data.

5. The method of claim 1,
wherein the SA signal comprises address information of the relay UE,
wherein the MAC header for transmitting the D2D data comprises a destination identifier, and
wherein, when determining that the D2D data is transmitted from the out-of-coverage UE, the relay UE detects the D2D data and relays the D2D data to an eNB indicated by the destination identifier.

6. The method of claim 1,
wherein the SA signal comprises a specific address value indicating the resource region configured for the usage of relaying,
wherein the MAC header for transmitting the D2D data comprises a destination identifier, and
wherein, when determining that the D2D data is transmitted from the out-of-coverage UE, the relay UE detects D2D data and relays the D2D data to an eNB indicated by the destination identifier.

7. A relay user equipment (UE) for processing device to device (D2D) data in a wireless access system supporting D2D communication, the relay UE comprising:
a transmitter;
a receiver; and
a processor configured to relay the D2D data in a manner of being functionally connected with the transmitter and the receiver, the processor configured to:
receive a scheduling allocation (SA) signal to allocate a resource region in which the D2D data is received,
receive the D2D data via the resource region,
when the SA signal or a medium access control (MAC) header related to the D2D data includes a relay indicator, determine that the D2D data is received from an out-of-coverage UE, and relay the D2D data,
when the SA signal and the MAC header do not include the relay indicator, determine that the D2D data is received from an in-coverage UE, and skip relaying of the D2D data, wherein the relay indicator indicates that the D2D data is received from the out-of-coverage UE.

8. The relay UE of claim 7, wherein the resource region corresponds to a resource pool allocated to the out-of-coverage or to the in-coverage UE.

9. The relay UE of claim 7, wherein, when determining that the D2D data is transmitted from the out-of-coverage UE, the D2D UE is synchronized with the relay UE in time and frequency.

10. The relay UE of claim 7, wherein the relay UE detects the D2D data based on a demodulation reference signal (DM-RS) defined for transmitting D2D data.

11. The relay UE of claim 7,
wherein the SA signal comprises address information of the relay UE,
wherein the MAC header for transmitting the D2D data comprises a destination identifier, and
wherein, when determining that the D2D data is transmitted from the out-of-coverage UE the relay UE detects the D2D data and relays the D2D data to an eNB indicated by the destination identifier.

12. The relay UE of claim 7,
wherein the SA signal comprises a specific address value indicating the resource region configured for the usage of relaying,
wherein the MAC header for transmitting the D2D data comprises a destination identifier, and
wherein, when determining that the D2D data is transmitted from the out-of-coverage UE, the relay UE detects the D2D data and relays the D2D data to an eNB indicated by the destination identifier.

* * * * *